(12) United States Patent
Koster et al.

(10) Patent No.: US 9,825,936 B2
(45) Date of Patent: *Nov. 21, 2017

(54) SYSTEM AND METHOD FOR PROVIDING A CERTIFICATE FOR NETWORK ACCESS

(71) Applicant: Cloudpath Networks, Inc., Wesminster, CO (US)

(72) Inventors: Kevin Lee Koster, Westminster, CO (US); Roger Lynn Haney, Denver, CO (US)

(*) Notice: Subject to any disclaimer, the term of this patent is extended or adjusted under 35 U.S.C. 154(b) by 139 days.

This patent is subject to a terminal disclaimer.

(21) Appl. No.: 14/637,381

(22) Filed: Mar. 3, 2015

(65) Prior Publication Data

US 2016/0261587 A1 Sep. 8, 2016

Related U.S. Application Data

(63) Continuation-in-part of application No. 13/454,737, filed on Apr. 24, 2012, now Pat. No. 9,137,235.

(Continued)

(51) Int. Cl.
*H04L 9/32* (2006.01)
*H04L 29/06* (2006.01)
(Continued)

(52) U.S. Cl.
CPC .......... *H04L 63/0823* (2013.01); *G06F 21/00* (2013.01); *G06F 21/33* (2013.01);
(Continued)

(58) Field of Classification Search
CPC ........ G06F 21/00; G06F 21/33; G06F 21/335; G06F 21/34; G06F 21/41; G06F 21/51;
(Continued)

(56) References Cited

U.S. PATENT DOCUMENTS 6,112,304 A * 8/2000 Clawson ............... G06F 9/4875
709/202
6,128,738 A * 10/2000 Doyle ................. H04L 63/0823
709/228

(Continued)

FOREIGN PATENT DOCUMENTS

CA 2768417 A1 * 1/2011 ............ H04W 12/06
CN 103237038 A * 8/2013
(Continued)

OTHER PUBLICATIONS

Benjumea, "A First Approach to Provide Anonymity in Attribute Certificates", vol. 2947 of Lecture Notes in Computer Science, Mar. 20, 2013, pp. 402-415.*

(Continued)

*Primary Examiner* — Luu Pham
*Assistant Examiner* — Walter Malinowski
(74) *Attorney, Agent, or Firm* — Daniel W. Roberts; Law Offices of Daniel W. Roberts, LLC

(57) ABSTRACT

Provided is a system and method for providing a certificate, and more specifically a certificate for network access upon a second system. The method includes, identifying a first system having at least one processor and a plurality of users, each user having at least one attribute; receiving from a third party at least one required attribute for certificate based network access; receiving from a user known to the first system a request for certificate based network layer network access to a second system having at least one processor, the request having at least one identifier; querying the first system with the at least one identifier for attributes associated with the user requesting the certificate based network layer network access to a second system; evaluating the attributes associated with the user requesting the certificate to the at least one predefined attribute; and in response to at least one attribute associated with the user requesting the (Continued)

certificate correlating to the at least one predefined attribute, providing from a system other than the first system, as requested by the user a certificate with at least one characteristic for certificate based network layer network access on the second system, the second system distinct from the first system. An associated system for providing a Certificate is also provided.

44 Claims, 7 Drawing Sheets

Related U.S. Application Data

(60) Provisional application No. 61/614,990, filed on Mar. 23, 2012.

(51) Int. Cl.
  G06F 21/51 (2013.01)
  G06F 21/00 (2013.01)
  G06F 21/33 (2013.01)
  G06F 21/34 (2013.01)
  H04W 12/06 (2009.01)

(52) U.S. Cl.
  CPC ............ G06F 21/34 (2013.01); G06F 21/51 (2013.01); H04L 9/3263 (2013.01); H04L 63/0815 (2013.01); H04W 12/06 (2013.01)

(58) Field of Classification Search
  CPC ............ H04L 9/3263; H04L 63/0807; H04L 63/0815; H04L 63/0823; H04W 12/06
  USPC ............................ 726/3, 8, 10; 713/156, 182
  See application file for complete search history.

(56) References Cited

U.S. PATENT DOCUMENTS

| | | | | |
|---|---|---|---|---|
| 6,353,886 B1* | 3/2002 | Howard | ............ | H04L 41/0893 380/255 |
| 6,571,221 B1* | 5/2003 | Stewart | ............ | H04L 12/14 705/52 |
| 6,687,823 B1* | 2/2004 | Al-Salcian | ............ | G06F 21/40 713/159 |
| 6,854,056 B1* | 2/2005 | Benantar | ............ | H04L 9/3263 380/282 |
| 7,103,001 B1* | 9/2006 | Cordsmeyer | ............ | H04M 3/007 370/241 |
| 7,174,456 B1* | 2/2007 | Henry | ............ | H04L 63/0428 380/247 |
| 7,249,375 B2 | 7/2007 | Bhatia et al. | | |
| 7,353,383 B2 | 4/2008 | Skingle | | |
| 7,428,750 B1 | 9/2008 | Dunn et al. | | |
| 7,496,954 B1* | 2/2009 | Himawan | ............ | G06F 21/41 726/8 |
| 7,543,147 B2* | 6/2009 | Benantar | ............ | G06F 21/33 713/155 |
| 7,697,690 B2* | 4/2010 | Fu | ............ | H04L 9/083 380/239 |
| 7,788,493 B2 | 8/2010 | Mononen et al. | | |
| 7,913,298 B2 | 3/2011 | Bhatia et al. | | |
| 7,953,979 B2 | 5/2011 | Borneman et al. | | |
| 8,060,914 B2* | 11/2011 | Zeng | ............ | G06F 21/33 713/168 |
| 8,214,394 B2* | 7/2012 | Krishnaprasad | .. | G06F 17/30427 707/709 |
| 8,275,985 B1* | 9/2012 | Narayanan | ............ | G06Q 50/14 713/150 |
| 8,327,141 B2* | 12/2012 | Vysogorets | ............ | G06F 21/34 713/168 |
| 8,572,709 B2* | 10/2013 | Hockings | ............ | G06F 21/41 726/18 |
| 8,689,299 B2* | 4/2014 | McBride | ............ | G06F 21/41 380/270 |
| 8,752,152 B2* | 6/2014 | Kol | ............ | H04L 12/58 726/8 |
| 8,763,081 B2* | 6/2014 | Bogdanovic | ............ | G06F 21/34 455/410 |
| 8,881,257 B2* | 11/2014 | Cha | ............ | G06F 21/335 726/10 |
| 9,137,235 B2* | 9/2015 | Koster | ............ | G06F 21/51 |
| 9,177,124 B2* | 11/2015 | Krishnaprasad | .... | G06F 21/6227 |
| 9,418,213 B1* | 8/2016 | Roth | ............ | G06F 21/31 |
| 9,438,597 B1* | 9/2016 | Taylor | ............ | H04L 63/10 |
| 9,544,298 B2* | 1/2017 | Falk | ............ | G06F 21/33 |
| 2002/0095507 A1* | 7/2002 | Jerdonek | ............ | H04L 9/3271 709/229 |
| 2002/0138735 A1* | 9/2002 | Felt | ............ | G06Q 20/3829 713/176 |
| 2002/0144119 A1* | 10/2002 | Benantar | ............ | G06F 21/33 713/171 |
| 2002/0157002 A1* | 10/2002 | Messerges | ............ | G06F 21/10 713/155 |
| 2002/0161904 A1* | 10/2002 | Tredoux | ............ | H04L 63/0281 709/229 |
| 2003/0037233 A1* | 2/2003 | Pearson | ............ | G06F 21/33 713/156 |
| 2003/0095663 A1* | 5/2003 | Nelson | ............ | H04L 9/083 380/270 |
| 2003/0149871 A1* | 8/2003 | Medvinsky | ............ | H04L 63/0807 713/155 |
| 2003/0154407 A1* | 8/2003 | Kato | ............ | H04L 63/0492 726/5 |
| 2004/0015724 A1* | 1/2004 | Pham | ............ | H04L 63/102 713/179 |
| 2004/0034774 A1* | 2/2004 | Le Saint | ............ | G06F 21/445 713/169 |
| 2004/0093492 A1* | 5/2004 | Daude | ............ | H04L 63/0227 713/156 |
| 2004/0243804 A1* | 12/2004 | Tajima | ............ | H04L 63/102 713/175 |
| 2004/0250140 A1* | 12/2004 | Chavis | ............ | H04L 67/20 726/4 |
| 2005/0021956 A1* | 1/2005 | Genty | ............ | G06F 21/41 713/170 |
| 2005/0060549 A1* | 3/2005 | England | ............ | G06F 21/10 713/175 |
| 2005/0144437 A1* | 6/2005 | Ransom | ............ | G06F 1/28 713/151 |
| 2005/0172335 A1* | 8/2005 | Aday | ............ | G06Q 20/4016 726/10 |
| 2005/0273518 A1* | 12/2005 | Patrick | ............ | G06Q 10/00 709/238 |
| 2005/0287990 A1* | 12/2005 | Mononen | ............ | G06F 21/335 455/411 |
| 2006/0075475 A1* | 4/2006 | Boulos | ............ | G06F 21/33 726/6 |
| 2006/0080352 A1 | 4/2006 | Boubez et al. | | |
| 2006/0106836 A1* | 5/2006 | Masugi | ............ | G06F 21/33 |
| 2006/0129815 A1* | 6/2006 | Baldwin | ............ | H04L 9/12 713/168 |
| 2006/0129817 A1* | 6/2006 | Borneman | ............ | G06F 21/41 713/170 |
| 2006/0177034 A1* | 8/2006 | Reding | ............ | H04M 3/46 379/211.02 |
| 2006/0200671 A1* | 9/2006 | Ishigaki | ............ | G06Q 20/367 713/176 |
| 2006/0264202 A1* | 11/2006 | Hagmeier | ............ | H04L 63/0823 455/411 |
| 2006/0277282 A1* | 12/2006 | Christensen | ............ | H04L 67/2814 709/223 |
| 2007/0006322 A1* | 1/2007 | Karimzadeh | ............ | G06F 19/323 726/27 |
| 2007/0198832 A1* | 8/2007 | Novack | ............ | H04L 9/3231 713/158 |
| 2007/0199049 A1* | 8/2007 | Ziebell | ............ | H04L 63/10 726/3 |

(56) References Cited

U.S. PATENT DOCUMENTS

| | | | |
|---|---|---|---|
| 2007/0206537 A1* | 9/2007 | Cam-Winget | H04L 63/162 370/331 |
| 2007/0206547 A1* | 9/2007 | Gong | H04L 45/122 370/338 |
| 2007/0234410 A1* | 10/2007 | Geller | G06F 21/31 726/8 |
| 2007/0288247 A1* | 12/2007 | Mackay | G06Q 10/00 705/1.1 |
| 2008/0028206 A1* | 1/2008 | Sicard | H04L 63/0407 713/156 |
| 2008/0046727 A1* | 2/2008 | Kanekar | H04L 63/166 713/168 |
| 2008/0072301 A1 | 3/2008 | Chia et al. | |
| 2008/0086759 A1* | 4/2008 | Colson | G06F 21/34 726/2 |
| 2008/0189764 A1* | 8/2008 | Gronholm | G06F 15/16 726/3 |
| 2008/0263629 A1 | 10/2008 | Anderson | |
| 2008/0263644 A1* | 10/2008 | Grinstein | G06F 21/445 726/6 |
| 2008/0313716 A1* | 12/2008 | Park | H04L 63/104 726/4 |
| 2009/0037729 A1 | 2/2009 | Smith et al. | |
| 2009/0172776 A1 | 7/2009 | Makagon et al. | |
| 2009/0271409 A1 | 10/2009 | Ghosh | |
| 2009/0287935 A1* | 11/2009 | Aull | H04L 9/3263 713/182 |
| 2009/0300344 A1* | 12/2009 | Maurya | H04L 9/3263 713/150 |
| 2010/0077208 A1 | 3/2010 | Appiah et al. | |
| 2010/0100926 A1* | 4/2010 | Binding | G06F 21/41 726/1 |
| 2010/0185864 A1* | 7/2010 | Gerdes, Jr. | H04L 9/3213 713/175 |
| 2010/0191960 A1* | 7/2010 | Beck | G06F 21/34 713/156 |
| 2010/0205541 A1* | 8/2010 | Rapaport | G06Q 10/10 715/753 |
| 2010/0235625 A1* | 9/2010 | Pandey | H04L 9/3263 713/156 |
| 2010/0299251 A1* | 11/2010 | Thomas | G06Q 20/10 705/39 |
| 2010/0306533 A1* | 12/2010 | Phatak | G06F 21/34 713/156 |
| 2011/0010364 A1* | 1/2011 | Ahtisaari | G06F 17/30867 707/724 |
| 2011/0093709 A1* | 4/2011 | Lunt | G06F 17/30864 713/168 |
| 2011/0154443 A1* | 6/2011 | Thakur | G06F 21/41 726/3 |
| 2011/0167257 A1* | 7/2011 | Gossel | H04L 9/321 713/156 |
| 2011/0173246 A1* | 7/2011 | Eschenauer | H04L 67/22 709/201 |
| 2011/0239282 A1* | 9/2011 | Svarfvar | H04L 63/0815 726/5 |
| 2011/0306364 A1* | 12/2011 | Gossain | H04L 12/5692 455/456.6 |
| 2011/0313863 A1* | 12/2011 | Carter | G06F 17/30867 705/14.66 |
| 2011/0314532 A1* | 12/2011 | Austin | H04L 9/3213 726/8 |
| 2011/0321152 A1* | 12/2011 | Tor | H04L 63/164 726/12 |
| 2012/0023568 A1 | 1/2012 | Cha et al. | |
| 2012/0054842 A1* | 3/2012 | Urios Rodriguez | G06F 21/32 726/6 |
| 2012/0069131 A1* | 3/2012 | Abelow | G06Q 10/067 348/14.01 |
| 2012/0072979 A1 | 3/2012 | Cha et al. | |
| 2012/0179907 A1* | 7/2012 | Byrd | H04L 9/3268 713/156 |
| 2012/0191606 A1* | 7/2012 | Milne | G06Q 10/101 705/44 |
| 2012/0192258 A1* | 7/2012 | Spencer | H04W 12/06 726/7 |
| 2012/0209890 A1* | 8/2012 | Nowacki | G06F 17/30536 707/805 |
| 2012/0227087 A1* | 9/2012 | Brown | G06Q 50/01 726/3 |
| 2012/0291114 A1* | 11/2012 | Poliashenko | G06F 21/41 726/8 |
| 2013/0019090 A1* | 1/2013 | Wicker | H04L 63/0823 713/151 |
| 2013/0073460 A1* | 3/2013 | Paquin | G06F 21/6263 705/44 |
| 2013/0117831 A1* | 5/2013 | Hook | G06F 21/335 726/6 |
| 2013/0125217 A1* | 5/2013 | Edwards | G06F 21/6218 726/4 |
| 2013/0150033 A1* | 6/2013 | Gossain | H04L 12/5692 455/434 |
| 2013/0159703 A1* | 6/2013 | Himawan | H04L 63/0823 713/156 |
| 2013/0166918 A1* | 6/2013 | Shahbazi | H04L 9/0863 713/183 |
| 2013/0185791 A1* | 7/2013 | Xie | G06F 21/316 726/22 |
| 2013/0187926 A1* | 7/2013 | Silverstein | G06Q 10/105 345/440 |
| 2013/0191884 A1* | 7/2013 | Leicher | H04L 63/08 726/4 |
| 2013/0254865 A1* | 9/2013 | Koster | G06F 21/51 726/10 |
| 2013/0254867 A1* | 9/2013 | Koster | G06F 21/51 726/10 |
| 2013/0339740 A1* | 12/2013 | Ben-Shalom | H04L 9/3268 713/175 |
| 2014/0075025 A1* | 3/2014 | Stanforth | H04W 48/14 709/225 |
| 2014/0096207 A1* | 4/2014 | Gilbert | G06F 21/44 726/5 |
| 2014/0122869 A1* | 5/2014 | Koster | H04L 63/0807 713/156 |
| 2014/0351577 A1* | 11/2014 | Vishal | H04L 9/3263 713/156 |
| 2014/0359606 A1* | 12/2014 | Salameh | G06F 8/61 717/178 |
| 2014/0376555 A1* | 12/2014 | Choi, II | H04L 49/70 370/395.53 |
| 2015/0095999 A1* | 4/2015 | Toth | H04L 63/08 726/6 |
| 2016/0073440 A1* | 3/2016 | Pallen | H04W 76/025 370/329 |

FOREIGN PATENT DOCUMENTS

| | | | | |
|---|---|---|---|---|
| JP | 2006227929 A | * | 8/2006 | |
| KR | 20100120758 A | * | 11/2010 | |
| WO | WO 2011134002 A1 | * | 11/2011 | G06F 21/335 |
| WO | WO 2013141900 A1 | * | 9/2013 | G06F 21/51 |
| WO | WO 2013141903 A1 | * | 9/2013 | G06F 21/51 |

OTHER PUBLICATIONS van der Merwe, "Fully Self-Organized Peer-to-Peer Key Management for Mobile Ad Hoc Networks", WiSe'05, Sep. 2, 2005, 10 pages.*

Oo, "Access Control System for Grid Security Infrastructure", 2007 IEEE/WIC/ACM International Conference on Web Intelligence and Intelligent Agent Technology, pp. 299-302.*

Camenisch, "Enhancing Privacy of Federated Identity Management Protocols", WPES'06, Oct. 30, 2006, pp. 67-71.*

Schwenk, "The Power of Recognition—Secure Single Sign-On using TLS Channel Bindings", DIM '11, Oct. 21, 2011, pp. 63-72.*

(56) References Cited

OTHER PUBLICATIONS

Lonea, "Security Issues for GRID Systems", 2010 4th International Workshop on Software Computing Applications (SOFA), Jul. 15-17, 2010, 4 pages.*
Huang, "Privacy-Preserving Multi-Dimensional Credentialing Using Veiled Certificates", CSIIRW '09, Apr. 13-15, 2009, Oak Ridge, Tennesseee, 14 pages.*
Kang, "A Peer-to-Peer Federated Authentication System", 2009 Sixth International Conference on Information Technology: New Generations, IEEE Computer Society, pp. 382-387.*
David, "Secure Single Sign-On and Web Authentication", May 16, 2011, pp. 1-14.*
Paulin, "Secure SQL Server—Enabling Secure Access to Remote Relational Data", 2012, pp. 1-21.*
David, "A Framework for Secure Single Sign-On", 2011, International Association for Cryptologic Research, 13 pages.*
De Clerq, "Application Security Certificates", Technet Microsoft, Aug. 11, 2003, 17 pages.*
Hong, "Secure Authentication in Group Communications Using Media Access Control (MAC) Address", Recent Patents on Computer Science 2010, pp. 14-19.*
"User Guide for the Cisco Secure Access Control System 5.0", Cisco, Nov. 30, 2009, 466 pages.*
"Barracuda Networks Product Catalog", Jun. 9 2011, 34 pages.*
Barracuda Networks Product Catalog, 2011, 34 pages.*
Van der Merwe, "Fully Self-Organized Peer-to-Peer Key Management for Mobile Ad Hoc Networks", WiSe'05, Sep. 2, 2005, Cologne, Germany, 10 pages.*
Iliev, "Prototyping an Armored Data Vault, Rights Management on Big Brothers Computer", Privacy Enhancing Technologies, 2002, Springer-Verlag, 18 pages.*
Van der Merwe, "Security Mechanisms for Distributed Communication Systems", PhD Eng Thesis, University of KwaZulu-Natal, South Africa, Jun. 27 2010, 202 pages.*
Bobba, "Bootstrapping Security Associations for Routing in Mobile Ad-Hoc Networks", GLOBECOM 2003, pp. 1511-1515.*
Markovic, "Data Protection Techniques, Cryptographic Protocols and PKI Systems in Modern Computer Networks", IP.com 04381086, Jul. 27 2007, pp. 13-24.*
"Network Access Layer, Structure of Ethernet Frame, What are runt and giant frames", Omnisecu, Mar. 6 2009, 4 pages.*
"Sun Java System Access Manager 7.1 Federation and SAML Administration Guide", Oracle, Jan. 3 2006, 2 pages.*
Srisuresh, "Secure Remote Access with L2TP", RFC 2888, Aug. 2000, 24 pages.*
Touch, Problem and Applicability Statement for Better-Than-Nothing Security (BTNS), May 5, 2005, RFC 5387, 34 pages.*
Fugkeaw, "Exploiting X.509 Certificate and Multi-Agent System Architecture for Role-based Access Control and Authentication Management", Seventh International Conference on Computer and Information Technology, 2007, IEEE. pp. 733-738.*
Holz, "The SSL Landscape—A Thorough Analysis of the X.509 PKI Using Active and Passive Measurements", IMC'11, Nov. 2-4 2011, Berlin Germany, pp. 427-443.*

* cited by examiner

Granted Permission Based Certificate

Certificate Based on List Membership

SYSTEM AND METHOD FOR PROVIDING A CERTIFICATE FOR NETWORK ACCESS

CROSS REFERENCE TO RELATED APPLICATIONS

The present application is a continuation of U.S. patent application Ser. No. 13/454,737, filed Apr. 24, 2012, published as US 2013/0254867, now U.S. Pat. No. 9,137,235, which itself claimed benefit under 35 U.S.C. §119(e) of U.S. Provisional Application No. 61/614,990 filed Mar. 23, 2012 the disclosures of each being incorporated herein by reference.

FIELD OF THE INVENTION

The present invention relates generally to systems and methods for establishing authentication of users of computer networks, and more specifically to systems and methods for issuing digital certificates to users of secured networks, the certificates identifying the users and also controlling, at least in part, the scope of network access afforded to the user.

BACKGROUND

In the physical world, individual persons are able to assess one another by sight, hearing and an accounting of physical attributes. Drivers' licenses, passports and other regulated documents provide verified accountings of attributes that permit individuals to validate who they are, or for others to validate who an individual says he or she is.

Fingerprints, retinal pattern, breath and DNA among other attributes are understood and recognized to be highly individualistic and are widely accepted and used to verify identity. But these attributes are physical and tied to a physical world.

Computers have become commonplace and highly integrated in nearly all aspects of modern life—transcending the bounds of professional and social spaces, computers are a prominent fixture in the workplace, in the home, as mobile devices and in many other places and arenas of daily life and modern existence.

Increasingly individuals are representing themselves in the cyber world of computer systems and computer networks, where digital information in the elemental form of binary data is entirely ignorant of physicality. A critical problem in cyberspace is knowing with whom you are dealing—in short, at the present time there is no precise way to determine the identity of a person in digital space. Friends, families, colleagues may use a common computer, share passwords, or even pretend to be people they are not. Sometimes these actions are benign—sometimes they are not.

Traditionally different systems establish individualized, but similar signup and login procedures to collect information directly from users so as to establish user identities, passwords and other information in the effort to establish at least a notion of an identity for a user.

A typical person over the age of ten in a modern household with access to computer resources may have a number of user accounts, each with a user name and password as well as perhaps additional security measures such as pin numbers, security images, test questions, and the like.

But the redundancy of such systems, especially where use of a system is occasional or only desired for a brief interaction leads to many problems. Users struggling to remember passwords default to the use of simple phrase, such as "password", "opensaysme", "abcdgoldfish", "0p3n4m3" or other simplistic phrases that are easily compromised. Although advances in data storage have increased dramatically in recent years there are still costs involved in archiving data—and establishing a user account and maintaining the data records for such an account may be costly for a system where the a high percentage of users never return.

Indeed, in some cases when a user is faced with forgetting his or her prior login information or being unsure if he or she even has an existing identity, the user may opt to create a new identity rather than try and recover the old identity—an action that further leads to increases in archived data, increased storage requirements, potential maintenance issues, and of course costs in terms of time, energy and money.

Increasingly users are establishing identities with large network based systems that provide a variety of resources, such as social media networks. Comprised usually of many different systems operating in harmony most of these systems permit a user to log in once—a single sign on (SSO) and be remembered as he or she makes use of different resources for different activities, uploading pictures, playing games, posting comments to friends about this or that, researching interests, etc. . . . . . Operating collectively, systems of this type may be referred to as a federated system, and once a user has established his or her identity through an initial account setup and login, he or she enjoys access to all elements within the federation seamlessly based on the single sign on.

Digital certificates, also known as public key certificates, are electronic documents that bind a digital signature (a mathematical schema for demonstrating authenticity) to a key, such as a public key, that is tied to an identity. A public key infrastructure (PKI) is a set of hardware, software, people, policies and/or procedures used to create, manage, distribute, use, store and revoke digital certificates. When referring to or working with digital certificates, in many cases a PKI is implied. More simply put, digital certificates are electronic documents that are offered to prove or verify the identity of user. Typically a digital certificate is issued by a certificate authority (CA) that has performed or established some threshold of information to assert that the party to whom the certificate is issues is indeed the party he or she reports to be.

In addition to identifying a person, a digital certificate may also include additional information, which may be used to determine the level of authorization that should be afforded to the holder of the digital certificate. Examples include the duration of validity for the certificate, the user's real name, the user's alternative name, the intermediate certificate authority who issued the certificate, the type of computer system used when requesting the certificate, the type of computer system authorized for use with the certificate, or other such information pertinent to establishing both the identity of the user of the digital certificate as well as the veracity of the root certificate authority ultimately responsible for the apparent authority vested in the digital certificate.

Indeed, digital certificates can and often do provide a great deal of simplicity in authenticating a user as the user has clearly established him or herself in some way that is sufficient for a certificate authority to provide the digital certificate. Relying on a digital certificate can ease a network's reliance on parties having previously established or contemporaneously establishing a local identity—a savings both in terms of time for the user and costs associated with the overhead and storage of the user identity for the local network.

Some attempts have been made to combine single sign on capabilities with the digital certificates, but as these efforts are not truly transparent and typically require a new system acting as a proxy on behalf of the user.

In U.S. Pat. Nos. 7,913,298 and 7,249,375 to Bhatia et all, methods and apparatus for end to end identity propagation are presented by adding a middle tier between the user and a legacy system that requires a username and password to allow single sign on via digital certificates. Simply put the middle tier uses the certificates and the SSO system to authorize the middle tier to access the legacy system on behalf of the user, and therefore act as a proxy. Indeed in Bhatia, the SSO system provides a token to the middle tier "to prove that the middle tier is authorized to act as the user's proxy." Although perhaps effective in some situations, Bhatia fails to provide a solution for situations where use of a middle tier is impractical or where the user and network desire a more direct form of interaction without an intervening proxy.

In US Patent Application 2002/0144119 to Benantar, methods and systems for network single sign-on using a public key certificate and an associated attribute certificate are again achieved by employing a middle tier system. After an initial configuration phase, the SSO manager application performs password management for the user, such that after the user completes a single authentication process with the SSO manger, the SSO manager acts as an authentication agent to perform subsequent authentication processes that are required by target legacy applications. The user must provide to the middle tier system, i.e. the SSO manager, any necessary information for identifying the target legacy applications which the user desires the middle tier system, e.g. the SSO manager, to act as an intermediary. In other words the user establishes an account with the SSO manager and authorizes the SSO manager to act as an authentication agent to perform subsequent authentication processes that are required by legacy applications. Attributes regarding security clearance or other authorization information associated with the user are embedded in the certificate, and when access to a legacy system is desired, the SSO manager decrypts the encoded certificate to extract the user's traditional login information so that the SSO manger may complete the login on behalf of the user. Again, although perhaps effective in some settings, the requirement of the user to interact directly with the SSO prevents application of Benantar in situations where use of a middle tier is impractical or otherwise undesired, and/or where the user may not wish to establish yet another account.

A single sign on may well simplify the users experience, but verifying and authenticating identity on one SSO system may not fully extend to the granular requirements and desires of different third party networks or applications each desiring different levels of security. Indeed a single digital certificate based on a single sign on may be of little value or use to a plurality of different third party networks or applications. For example the digital certificate used to access a users bank account or investment portfolio more than likely should be different from the same user's digital certificate used to access a coffee shop network—each system having different levels of security, duration for access, etc. . . . .

Moreover, whereas most single sign on systems attempt to streamline a user's multiple identities into one, in many instances the accessed networks or applications may well desire individualized distinctions that truly rely on multiple different identities.

Hence there is a need for a method and system that is capable of overcoming one or more of the above identified challenges.

SUMMARY OF THE INVENTION

Our invention solves the problems of the prior art by providing novel systems and methods for providing a certificate.

In particular, and by way of example only, according to one embodiment of the present invention, provided is a method of providing a certificate for network access including: receiving at least one predefined attribute as criteria for receiving a certificate; receiving from a user known to a first system a request for network access to a second system, the request having at least one identifier; querying the first system with the at least one identifier for attributes associated with the user; evaluating the attributes associated with the user to the at least one predefined attribute; and in response to at least one attribute associated with the user correlating to at least one predefined attribute, providing the user with a certificate with at least one characteristic for network access on the second system.

In yet another embodiment, provided is a non-transitory machine readable medium on which is stored a computer program for providing a certificate for network access, the computer program including instructions which when executed by a computer system having at least one processor performs the steps of: receiving at least one predefined attribute as criteria for receiving a certificate; receiving from a user known to a first system a request for network access to a second system, the request having at least one identifier; querying the first system with the at least one identifier for attributes associated with the user; evaluating the attributes associated with the user to the at least one predefined attribute; and in response to at least one attribute associated with the user correlating to at least one predefined attribute, providing the user with a certificate with at least one characteristic for network access on the second system.

For another embodiment, provided is a non-transitory machine readable medium on which is stored a computer program for providing a certificate for network access, the computer program including instructions which when executed by a computer system having at least one processor performs the steps of: an input routine operative associated with an input device for receiving at least one predefined attribute as criteria for receiving a certificate, and for receiving from a user known to a first system a request for network access to a second system, the request having at least one identifier; a query routine for querying the first system with the at least one identifier for attributes associated with the user; an evaluating routine for evaluating the attributes associated with the user to the at least one predefined attribute; and an output routine for providing the user with a certificate with at least one characteristic for network access on the second system in response to at least one attribute associated with the user correlating to at least one predefined attribute.

Further, in yet another embodiment provided is a system for providing a certificate for network access including: a first system structured and arranged as a single sign on system having a plurality of user accounts; a third party structured and arranged to establish at least one predefined attribute for receiving a certificate permitting network access on a second system; an authorizing system structured and arranged to receive from the third party the at least one predefined attribute, and in response to a request from a user of the first system for a certificate for the second system the authorizing system further structured and arranged to access the first system to query user accounts for attributes associated with at least one user, the authorizing system providing a certificate with at least one characteristic for network access on the second system to at least one user having at least one attribute associated with the user correlated to the at least one predefined attribute.

Still, in yet another embodiment, provided is a method of providing a certificate for network access including: identifying a first system having a plurality users, each user having at least one attribute; receiving at least one required attribute for certificate based network access; querying the first system to determine at least a first subset of users having the at least one required attribute, and providing a certificate with at least one characteristic for network access on a second system to each user having the at least one required attribute.

Further still, in yet another embodiment, provided is a non-transitory machine readable medium on which is stored a computer program for providing a certificate for network access, the computer program including instructions which when executed by a computer system having at least one processor performs the steps of: an input routine operative associated with an input device for receiving at least one predefined required attribute as criteria for receiving a certificate; a query routine for querying a first system with a plurality of users each having at least one attribute to determine at least a first subset of users having the at least one predefined required attribute; and an output routine for providing a certificate with at least one characteristic for network access on the second system to each user having the at least one required attribute.

And yet, for another embodiment, provided is a non-transitory machine readable medium on which is stored a computer program for providing a certificate for network access, the computer program including instructions which when executed by a computer system having at least one processor performs the steps of: identifying a first system having a plurality users, each user having at least one attribute; receiving at least one required attribute for certificate based network access; an authorizing system receiving the at least one required attribute from the second system, the authorizing system querying the first system to determine at least a first subset of users having the at least one required attribute, and the authorizing system providing a certificate with at least one characteristic for network access on the second system to each user having the at least one required attribute.

Yet again, for another embodiment, provided is a system for providing a certificate for network access including: a first system structured and arranged as a single sign on system having a plurality of user accounts; a third party structured and arranged to establish at least one predefined required attribute for receiving a certificate permitting network access on the second system; and an authorizing system structured and arranged to receive from the third party the at least one predefined required attribute, and in response to a request from the third party to generate certificates for users of the first system having the at least one predefined required attribute, the authorizing system further structured and arranged to access the first system to query user accounts for attributes associated with at least one user, the authorizing system providing a certificate with at least one characteristic for network access on a second system to at least one user having at least one attribute associated with the user correlated to the at least one predefined required attribute.

Further still, in yet another embodiment, provided is a method of providing a certificate for network access including: receiving at least one predefined permission as criteria for receiving a certificate; querying a first system having a plurality of users to determine permissions granted to a second system by at least a first subset of users; and in response to at least one permission granted by a user in the first subset correlating to the at least one predefined permission, providing the user with a certificate with at least one characteristic for network access on the second system.

And further still, for yet another embodiment, provided is a method of providing a certificate for network access including: receiving at least one predefined permission as criteria for receiving a certificate; receiving from a user known to a first system a request for network access to a second system, the request having at least one identifier; querying the first system with the at least one identifier to determine granted permissions associated with the user; evaluating the determined granted permissions to the at least one predefined permission; and in response to at least one permission granted by the user correlating to the at least one predefined permission, providing the user with a certificate with at least one characteristic for network access on the second system.

Still, in yet another embodiment, provided is a method of providing a certificate for network access including: identifying a first system having a plurality users, identifying a first system having a plurality users, at least one user having at least one permission; receiving at least one predefined permission as criteria for receiving a certificate; querying the first system to determine at least a first subset of users having the at least one predefined permission, and providing a certificate with at least one characteristic for network access on a second system to each user having the at least one predefined permission.

Still further, in yet another embodiment, provided is a non-transitory machine readable medium on which is stored a computer program for providing a certificate for network access, the computer program including instructions which when executed by a computer system having at least one processor performs the steps of: receiving at least one predefined permission as criteria for receiving a certificate; querying a first system having a plurality of users to determine permissions granted to a second system by at least a first subset of users; and in response to at least one permission granted by a user in the first subset correlating to the at least one predefined permission, providing the user with a certificate with at least one characteristic for network access on the second system.

Yet still, for another embodiment, provided is a system for providing a certificate for network access including: a first system structured and arranged as a single sign on system having a plurality of user accounts; a third party structured and arranged to establish at least one predefined required permission for receiving a certificate permitting network access on a second system; and an authorizing system structured and arranged to receive from the third party the at least one predefined required permission, and in response to a request from the third party to generate certificates for users of the first system having the at least one predefined required permission, the authorizing system further structured and arranged to access the first system to query user accounts for permissions associated with at least one user, the authorizing system providing a certificate with at least one characteristic for network access on a second system to at least one user having at least one permission associated with the user correlated to the at least one predefined required permission.

Yet further still, for another embodiment, provided is a method of providing a certificate for network access including: receiving a listing of users; accessing a first system having a plurality of subsections; preparing at least one subsection of the first system for user membership based on the listing of users; and upon a user in the list of users accepting membership in the subsection of the first system, providing the accepting user with a certificate with at least one characteristic for network access on a second system.

And for yet another embodiment, provided is a method of providing a certificate for network access including: receiving a listing of users; accessing a first system having a plurality of users; querying the first system with the listing of users to determine at least a first subset of first system users; and preparing a certificate for network access on a second system for each of the first subset of first system users.

And for yet another embodiment, provided is a system for providing a certificate for network access including: a first system structured and arranged as a single sign on system having a plurality of user accounts; a third party structured and arranged to establish a list of users; and an authorizing system structured and arranged to receive the list of users from the third party and to query the first system with the listing of users to determine at least a first subset of first system users; and prepare a certificate for network access on a second system for each of the first subset of first system users.

And yet further, provided for another embodiment is a system for providing a certificate for network access including: a first system structured and arranged as a single sign on system having a plurality of user accounts; a third party structured and arranged to establish a list of users; and an authorizing system structured and arranged to receive the list of users from the third party and to prepare at least one subsection of the first system for user membership based on the listing of users; and upon a user in the list of users accepting membership in the subsection of the first system, to provide the accepting user with a certificate with at least one characteristic for network access on a second system.

BRIEF DESCRIPTION OF THE DRAWINGS AND SUPPORTING MATERIALS

DETAILED DESCRIPTION

Figure 1:
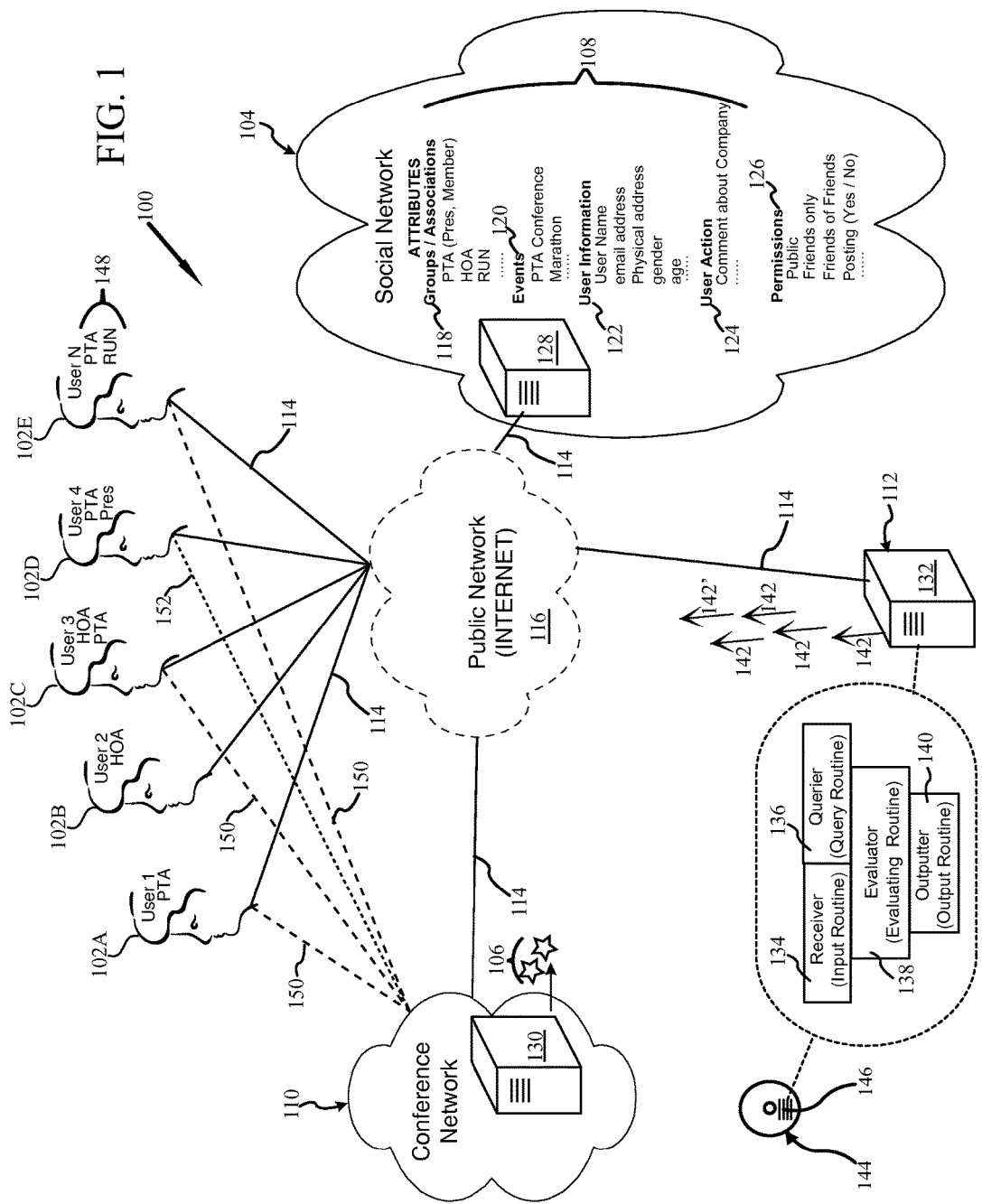
FIG. 1 illustrates a high level diagram of a system for providing a certificate for network access to users having at least one attribute and known to a first system so as to permit network access upon a second system in accordance with at least one embodiment.

Before proceeding with the detailed description, it is to be appreciated that the present teaching is by way of example only, not by limitation. The concepts herein are not limited to use or application with a specific system or method for providing a certificate, and more specifically a certificate for network access. Thus although the instrumentalities described herein are for the convenience of explanation shown and described with respect to exemplary embodiments, it will be understood and appreciated that the principles herein may be applied equally in other types of systems and methods involving providing a certificate.

This invention is described with respect to preferred embodiments in the following description with reference to the Figures, in which like numbers represent the same or similar elements. Further, with the respect to the numbering of the same or similar elements, it will be appreciated that the leading values identify the Figure in which the element is first identified and described, e.g., element 100 appears in FIG. 1.

To further assist in the following description, the following defined terms are provided.

"First System"—a web service or social networking site such as Facebook, YouTube, Google Apps, etc. . . . . The First System may be a federated system in that it is comprised of a collection of systems and applications that are operating in harmony and typically as a single sign on (SSO) system.

"Second System"—the network or application resource to which a User may connect or engage based on the user having an appropriate Certificate.

"Authorizing System"—the entity that, in response to a request to generate a certificate to permit network access polls the First System for Users having at least one predefined attribute that has been established as the basis for granting the certificate.

"User"—typically a person or at the very least a device used by a person who is known to the First System in the sense that the he or she has established a User account with the First System by providing a threshold of data, e.g. attributes, to identify themselves. Typically it is expected that the Users interactions with the First System will also serve to establish additional Attributes about themselves. For at least one embodiment, the Users have pages or accounts which may be viewed by other Users and or applications.

"Attribute"—an object associated with Users of the First System, such as but not limited to the User's data, the Users' associations, Users' events, and or actions taken by the User. More specifically User data may include but is not limited to username, email address, city, state, gender, age, relationship status, and other such generally personal data. Associations may include but are not limited to membership in a group, subscribing to another User, being a friend of another User, listing a school/company/employer, likes, and other such expressions of associated interests and involvements. Events may include but are not limited to expressions of intent to participate in future events or activities such as conferences, sporting events, trips, or the like. Actions may include but are not limited to commenting about a company or third party, liking a company or third party, friending a company or third party, or otherwise expressing an action involving the company or third party. For at least one embodiment the company or third party is understood and appreciated to be a Second System. For at least one alternative embodiment the company or third party are distinct from a Second System.

"Permissions"—for at least one embodiment, a User may also have a special subclass of Attributes which are permission(s) granted by the User to the Second System or Third Party. Indeed, absent a clear indication otherwise, a general Attribute should not be considered to include Permissions—as Permissions are very specific grants of rights to take actions towards or involving the Users pages or accounts, such as for example the permission to post comments on a Users page, permission to post images on a users page, permission to access the Users friends, permission to "friend" the User, etc. . . . . .

"Subsection"—a class or type of attribute such a group, group membership, tweet, or other classification of Attributes as may be encountered or implemented with respect to the First System.

"Certificate"—also referred to as a digital certificate, this is a credential that is usable for authentication to the Second System. In at least one embodiment, the Certificate is an X.509 digital certificate.

"Certificate Characteristic"—elements of data that are encoded into or associated with the Certificate. Certificate Characteristics may include but are not limited to, a root certificate authority, intermediate certificate authority, time period, common name, subject name, subject's alternative name.

"Service Account"—an account on the First System through which data can be collected by the Authorizing System.

"Third Party"—the entity specifying to the Authorizing System one required criteria for a Certificate to be provided. For at least one embodiment the required criteria is at least one predefined attribute or attributes that ideally should be associated with a User for he or she to be provided with a Certificate. For at least one alternative embodiment, the required criteria is at least one Permission. In varying embodiments, the Third Party may be the Second System itself, or an entity that is distinct from the Second System, such as for example an event coordinator, parent company, or other third party contractor who is otherwise empowered to decide the criteria for gaining network access upon the Second System.

To briefly summarize, provided is a system and method for providing a certificate to a User for network access upon a Second System. In general these Certificates are provided in response to either a request from a user having at least one pre-defined attribute or in response to a directive from a Third Party to prepare certificates for Users having at least one pre-defined attribute. In either case, it is the Users established identity with a First System that provides the assurance that the User is who he or she reports to be, and if they meet the criteria specified, they will be granted a Certificate. It is also to be understood and appreciated that the Certificate, if provided, need not be based on or otherwise incorporate elements from the Users established identity with the First System. Certainly the Certificate may contain information that is also provided in association with his or her account on the First System, but the Certificate is not and should not be taken as a proxy for the Users established identity with the First System. An issued Certificate stands on its own for use and application as and where needed and can be enjoyed independently from the First System.

Moreover, the First System provides an opportunity to gain basic authentication for a User as he or she has already established at least some threshold level of credentials as a known registered User of the First system. In addition, because of the social aspect of the First System, it is quite common for Users to provide a great deal of information about themselves—interests, hobbies, associations, lifestyle, opinions etc. . . . . . These elements of data, or Attributes are clearly associated with the User and may be used to identify one specific User of the First System or subsets of Users who share similar Attributes.

Indeed, with at least one required criteria being provided to the Authorizing System, the Authorizing System can query the First System to determine which Users are entitled to receive a Certificate for network access upon the Second System. In other words, the single sign on nature of the First System not only simplifies the Users involvement, but the ability to define and query for one or more specific attributes permits the creation of very specific Certificates tailored specifically to the needs or desires of a Second System. In addition, the nature of the Certificates can be varied such that the access provided is variable depending on how many Attributes, or even which combinations of Attributes a User or Users is/are found to posses.

This summary may be more fully appreciated with respect to the following description and accompanying figures and attachments.

FIG. 1 is a high level diagram of an embodiment of a System for Providing a Certificate, e.g., SPC 100, for network access to Users 102 having at least one required criteria 106, such as at least Attribute 108, and known to a First System 104 so as to permit network access upon a Second System 110 in accordance with at least one embodiment.

As used herein, the term "network access" is understood and appreciated to be the ability of a User 102 to make use of the resources of Second System 110—in short the telecommunications link establishing the connection to the network upon which an IP address is received. Only when this initial link is established may the user then enjoy use of the resources permitted by the Second System 100. This may include for example, but is not limited to, the use of applications, access to data, and connectivity to other systems and Users 102 within the Second System 110 as well as other public and private systems.

The Open System Interconnection model, also referred to as the Open Source Interconnection model or more simply the OSI model, is a product of the Open System Interconnection effort at the International Organization for Standardization, and more specifically is a prescription of characterizing and standardizing the functions of a communication system in terms of seven abstraction layers of concentric organization—Layer 1 the physical layer, Layer 2 the data link layer, Layer 3 the network layer, Layer 4 the transport layer, Layer 5 the session layer, Layer 6 the presentation layer, and Layer 7 the application layer.

TCP/IP based network communication is established at Layer 2-3, the network layer. It is at this layer that a digital certificate may be used as in the present invention to establish certificate based network access. By contrast, where digital certificates are employed to gate access to applications such control is implemented at the Layer 7, the application layer. Moreover, those skilled in the art of networks and digital certificates will appreciate that the distinction of digital certificate use for certificate based network access (Layer 2-3) is considerably different from certificate based application use (Layer 7). In other words, as set forth in the present invention, the provided digital certificate permits the network connection to be established in the first place—a condition that must exist before anything within the secured network may be used.

More specifically, in FIG. 1 there are shown a plurality of Users 102 of which Users 102A-102E identified as User 1, 2, 3, 4 and N are exemplary. An Authorizing System 112, First System 104 and Second System 110 are also shown, and for the case of the present example each of these entities is shown to have a communication link 114 to a public network 116 such as the Internet. In varying embodiments the elements of the SPC 100 may be directly connected to one another, but it is understood and appreciated that in most instances the incorporation of the Internet 116 as a common means of communication and information exchange is within the scope of the present invention.

It is also to be understood and appreciated that the elements of the SPC 100 need not maintain continual communication links 114. In other words, Users 102 may log on or off the First System 104, the Second System 110 may be on or off line at different times for different reasons, and the Authorizing System 112 may be on or off line at different times and for different reasons.

For ease of illustration and discussion of the present example, the First System 104 is as shown, a Social Network. Each of the plurality of Users 102, e.g., Users 102A-102E is known to the First System 104, and each of the Users 102 accesses the First System 104 by way of the Internet 116. Within the Social Network 104, each User 102 has a plurality of Attributes 108. Exemplary Attributes 108 have been illustrated including Groups 118, Events/Associations 120, User Information 122, User Actions 124.

For at least one embodiment, each User 102 may also have Permissions 126. Whereas general Attributes 108 are elements associated with the User 102, Permissions 126 are rights granted or otherwise established by the User 102 which determine what third parties and other Users may or may not be able to do and or see with respect to the User's account and/or page on the First System 104. Although in some situations Permissions 126 may be considered a special subclass of Attributes 108, in general Attributes 108 should not be considered to include Permissions 126.

This list of Attributes 108 is of course understood and appreciated to be exemplary of possible Attributes 108, and is not intended as a limitation for the types of Attributes 108 that may be present. In addition, for at least one embodiment it is understood and appreciated that at least some of these Attributes 108, such as but not limited to the Attribute 108 of Groups 118 or Events/Associations 120 may be viewed to establish a plurality of subsections for the First System 104.

As shown, the Social Network 104 is established by at least one computer system 128 (including microprocessors, memory, and the like) adapted at least in part to provide the First System 104. The Second System 110 is also provided by at least one computer system 130 (including microprocessors, memory, and the like) adapted at least in part to provide the Second System 110.

Similarly, the Authorizing System 112 is also provided by at least one computer system 130 (including microprocessors, memory, and the like) adapted at least in part to provide the Authorizing System 112. To facilitate this adaptation, in at least one embodiment the Authorizing System 112 has a receiver 134, a querier 136, an evaluator 138 and an outputer 140.

The receiver 134 is structured and arranged to receive information regarding requests for Certificates. More specifically, for at least one embodiment the receiver 134 receives at least one criteria 106 such as at least one predefined attribute as criteria for receiving a Certificate. This at least one predefined attribute 106 may be provided by the Second System 110 or other Third Party. Further, the receiver 134 may also receive from a User 102 known to the First System 104 a request for network access upon a Second System 110. This request from the User 102 may also at least one identifier.

The querier 136 is structured and arranged to query the First System 104 based on the information received by the receiver 134, and the evaluator 138 is structured and arranged to evaluate Attributes 108 of Users 102 identified by the querier 136 with respect to the information received by the receiver 134. Moreover, for at least one embodiment, the querier 136 will query a First System with a plurality of Users each having at least one attribute 108 to determine at least a first subset of users having the at least one predefined required attribute 106. For yet other embodiments, the querier 136 and evaluator 138 will query the first system with the at least one identifier for attributes associated with the User 102, and evaluate the Attributes 108 associated with the User 102 to the at least one predefined Attribute 106.

The outputer 140 is structured and arranged to provide a User 102 with a Certificate 142 having at least one characteristic for network access on the Second System. More specifically, the outputter 140 provides Certificates 142 to Users 102 who have at least one Attribute 108 correlating to the predefined Attribute 106. For at least one embodiment, the provided Certificates 142 are generally the same with respect to the scope of access permitted—though each of course may include sufficient specific information for the User 102 of the Certificate to be specifically identified. For at least one embodiment as will be more fully discussed below, the Authoring System 112 may provide Certificates 142 with permitting different network access based on the Users having different sets of correlating Attributes 108. For example Certificate 142 may be for general access whereas Certificate 142' may be for enhanced access.

With respect to SPC 100, it is understood and appreciated that in varying embodiments the elements, e.g., the receiver 134, the querier 136, the evaluator 138, and the outputer 140 may be provided as software routines, hardware elements and/or combinations thereof.

The elements of SPC 100, e.g., the receiver 134, the querier 136, the evaluator 138, and the outputer 140 have been illustrated distinctly for ease of illustration and discussion. In varying embodiments of course it is understood and appreciated that one or more of these elements may be combined and/or further subdivided into a number of sub-elements.

With respect to FIG. 1, the elements of the receiver 134, the querier 136, the evaluator 138, and the outputer 140 are conceptually illustrated in the context of an embodiment for a computer program. Such a computer program can be provided upon a non-transitory computer readable media, such as an optical disc 144, having encoded thereto an embodiment of a program for providing a Certificate 142 for network access as computer executable instructions 146.

The computer executable instructions 146 are provided to computer 132. During operation, the program for providing a Certificate 142 for network access may be maintained in active memory for enhanced speed and efficiency. In addition, the program for providing a Certificate 142 for network access may also be operated within a computer network and may utilize distributed resources.

For the sake of the present example, the Second System 110 is presented as a network at a conference for members of PTA associations. This Second System 110 is secure and intended only for use by the members of the conference. Further, for the sake of this example it is to be understood that within the PTA association there are at least general members and a president.

For the purposes of this example the general members are understood and appreciated to have general access to perform network functions—access websites, send email, receive and post tweets. The president is entitled to not only enjoy these network services, but is also permitted to adjust the network permissions of the general members. In other words the president can shunt email, web or twitter access if he or she believes that a general member has abused his or her privileges. Of course, the president may also enable other network features as he or she deems necessary.

As indicated by text labels 148, the exemplary users Users 102A, 102B, 102C, 102D and 102E have exemplary Attributes 108 relating to various Groups 118, exampled as PTA, HOA, and RUN. Moreover, with respect to FIG. 1, Users 102A, 102C, 102D and 102E are all appreciated to have the Attribute 108 of membership in the group PTA, and User 102D is appreciated to have an additional Attribute 108 identifying User 102D as the PTA president.

The network access 150 to Second System 110 afforded to the Users 102A, 102C and 102E by Certificates 142 provided by the Authorizing System 112 is shown in dotted lines as they are general members. The network access 152 afforded by the Certificate 142' provided by the Authorizing System 112 to User 102D as the president is different and illustrated as different dotted line.

Figure 2:
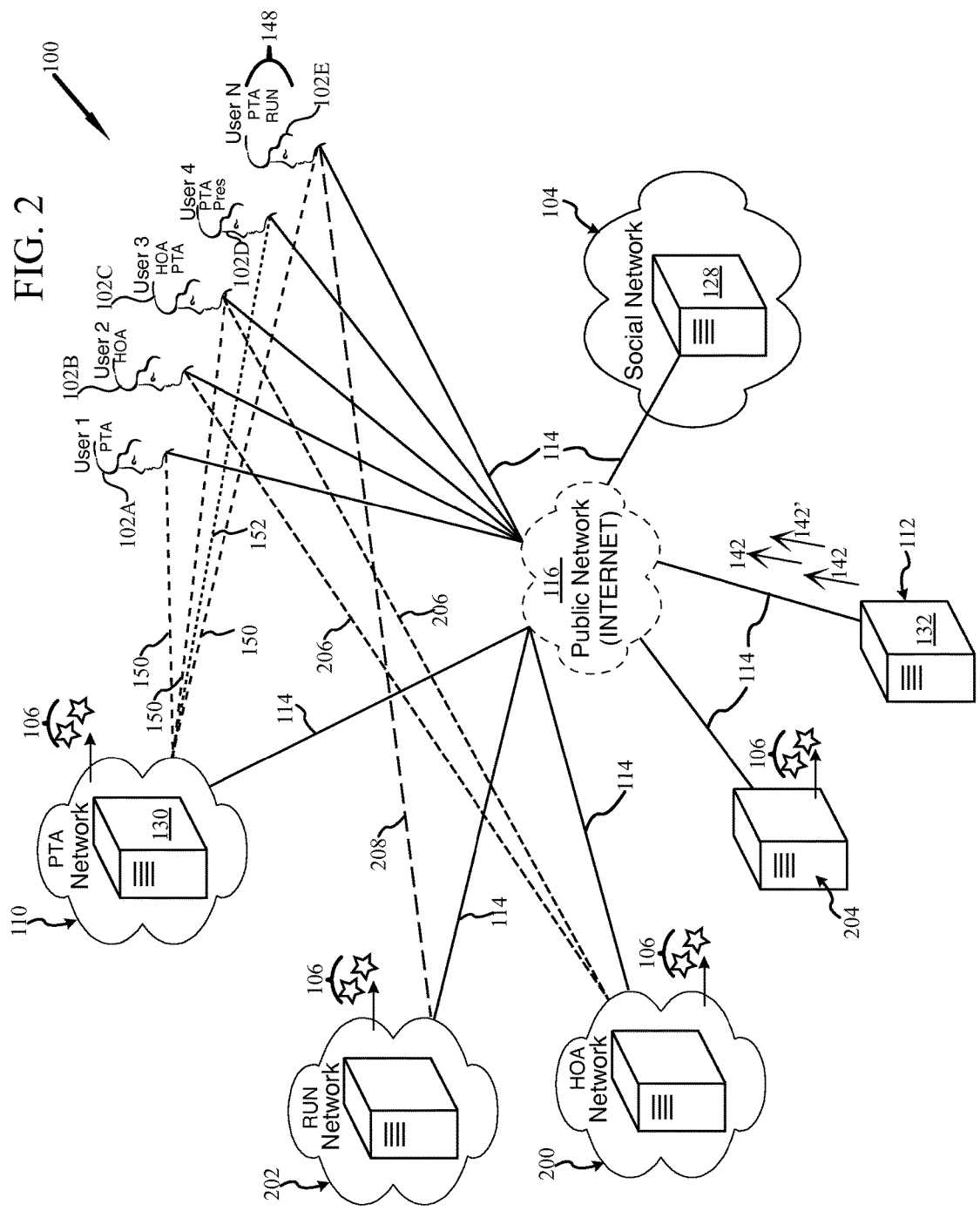
FIG. 2 illustrates another high level diagram of a system for providing a certificate for network access to users having at least one attribute and known to a first system so as to permit network access upon one or more second systems in accordance with at least one embodiment.

FIG. 2 extrapolates the operation depicted in FIG. 1 for SPC 100 with respect to a single Second System 110 to multiple Second Systems, e.g., 110, 200 and 202. More specifically, as shown in FIG. 2 there is the same PTA network of FIG. 1, e.g., Second System 110, but also a HOA Network as Second System 200 and a RUN Network as Second System 202.

In FIG. 2, a Third Party 204 is also shown. As noted above in the definitions, and as will be more fully discussed below, in varying embodiments the Third Party 204 is the entity specifying to the Authorizing System 112 the criteria 106, such as one or more predefined Attributes 106 that are ideally associated with a User. In varying embodiments the Third Party 204 may be a Second System for which the issued Certificates 142 will permit network access, e.g., Second System 110, or a distinct entity that is separate from the Second System upon which network access will be permitted to Users 102 holding proper Certificates 142.

The same Users 102A, 102B, 102C, 102D and 102E are also show, and each again has the same exemplary Attributes 108 indicated by text labels 148. Users 102B and 102C have the Attribute 108 of membership in the group HOA and as such have been provided with Certificates 142 by the Authorizing System 112 permitting network access 206 to Second System 200 (e.g., the HOA Network) indicated by yet other dotted different from the lines representing network access 150 and 152. User 102E is also shown to have the Attribute 108 of membership in the group RUN, and as such has been provided with a Certificate 142 by the Authorizing System 112 permitting network access 208 to Second System 202 (e.g., the RUN Network) is also indicated by another different dotted line.

Moreover, the dotted lines 150, 152, 206 and 208 conceptually illustrate how each User 102, enjoying a single sign on authentication with the First System 104, is afforded distinct Certificates 142 as applicable for each of the different Second Systems, 110, 200 and 202. In other words, the Authorizing System 112 is not merely checking and verifying each User's identity on the First System 104, nor is the Authorizing System 112 acting as a proxy to interface between the User and each Second System for login access.

In response to specific criteria—e.g., at least one predefined Attribute 106, the Authorizing System 112 is querying the First System 104 and providing Certificates 142 to those Users 102 and only those Users 102 who meet at least the threshold of having the specified criteria 106, e.g., at least one required and predefined Attribute 106.

As each Second System 110, 200 and 202 has been configured to accept the issued Certificate 142 as the basis for Authentication, each Second System 110, 200 and 202 is also permitted to avoid the overhead processing and storage that would otherwise be associated with the creation of individual user accounts. The Users 102 too are benefitted in that each User 102 does not have to establish yet another user account with each Second System 110, 200 and 202.

Because of the nature of some Certificates 142, for at least one embodiment it is understood and appreciated that the Certificate 142 is embedded with additional information regarding the User 102—such as but not limited to the type of system used by the User 102 to obtain the Certificate 142. In other words the Users Certificate 142 may be tied to a personal system or a work system. The date, IP address and physical location may also be encoded—and tracked to identify attempts to share or subvert use of the Second Systems 110, 200 and 202.

Indeed with respect to FIG. 2 it is understood and appreciated that the simplification of a single sign on from the perspective of the User 102 does not interfere with the User 102 actually having a plurality of different Certificates 142—each individually appropriate for a different Second System 110, 200 and/or 202. In other words, whereas traditional implementations of single sign on systems strive to eliminate multiple identities, embodiments of the present invention for SPC 100 actually use the single sign on system to generate multiple identities.

Having described at least two embodiments for SPC 100 as shown in FIGS. 1 and 2, other embodiments related to varying methods of providing a Certificate 142, and more specifically providing a Certificate 142 for network access upon a Second System 110 will now be discussed with respect to FIGS. 3-8 and FIGS. 1 and 2. Moreover, FIGS. 3-8 provide high level flow diagrams for varying embodiments of providing a Certificate 142 for network access. It will be appreciated that the described events and method need not be performed in the order in which it is herein described, but that each of these descriptions is merely exemplary of varying methods of implementing methodologies to provide a Certificate 142 for network access.

User Requested Certificate

Figure 3:
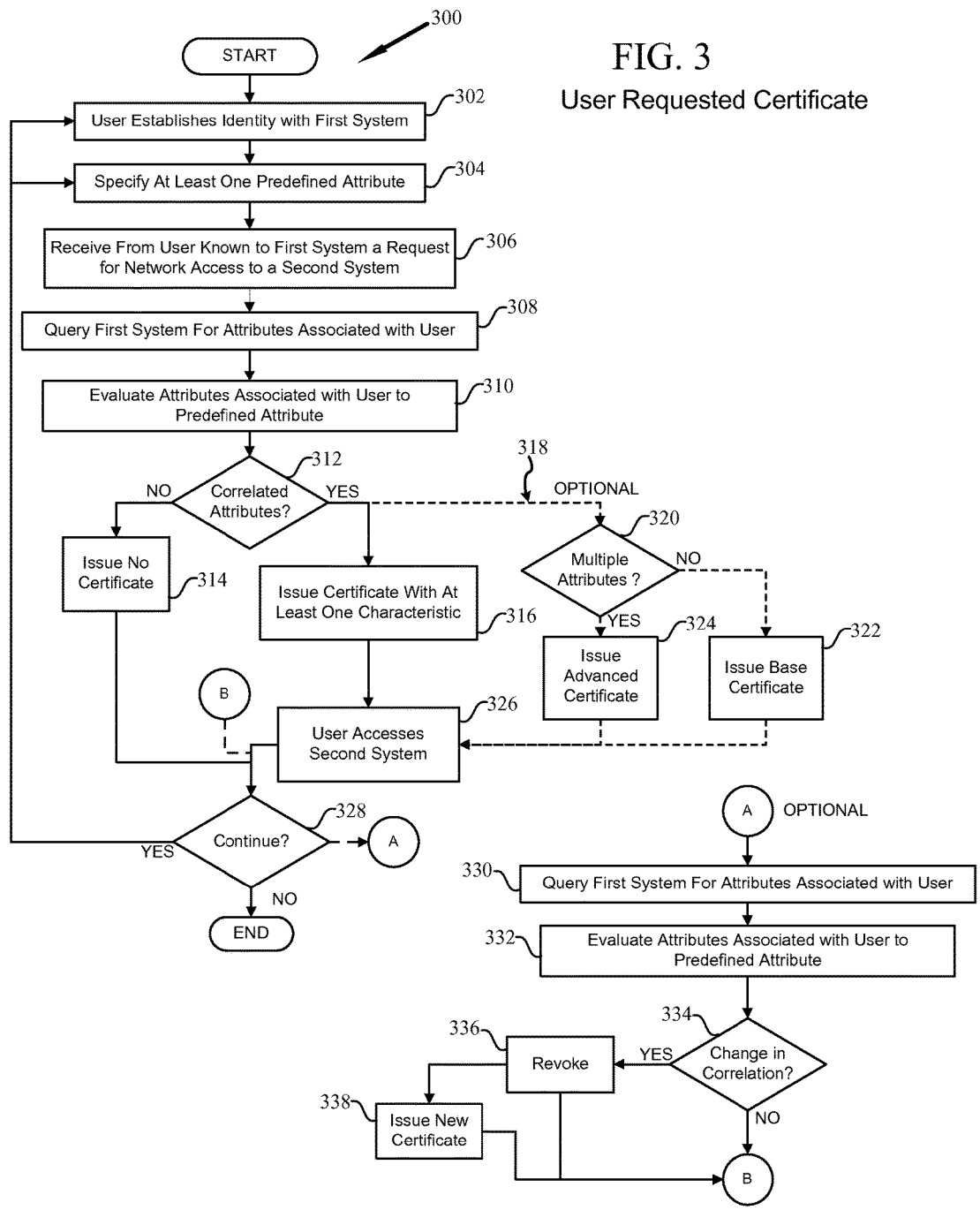
FIG. 3 is a high level flow diagram for a method of providing a certificate for network access upon a second system in response to a user request by a user having at least one predefined attribute in accordance with at least one embodiment.

Turning now to FIG. 3, in connection with FIGS. 1 and 2, for at least one method 300, the request for a Certificate 142 is at least in part initiated by a User 102 who desires access to a Second System 110. For the exemplary embodiment, method 300 typically commences with a User 102 establishing an identity with the First System 104, block 302. As noted above the First System 104 in at least one embodiment is a SSO system, and may further be a federated web service such as a social media site.

Indeed, there may be many Users 102A, 102B, 102C, 102D and 102E for example who have established identities with the First System 104. The precise nature of how each User 102 has established his or her identity is not of specific importance to the present teaching, but it is assumed that he or she has provided basic personal data, such as name, age, gender, address, email and completed at least a threshold of authentication processes, such as requesting a user ID and responding to an email confirming and/or verifying the request. Of course, it is understood and appreciated that this method of establishing a user identity with the First System 104 is merely one example of how a User may become known to the First System, and alternative systems and or methods may certainly be employed.

For the sake of this example it is assumed that the Second System 110 is hosting a conference for the PTA, and the Second System 110 desires to have Certificates 142 for network access issued to each of the Users 102 known to the First System 104 who is a member of the PTA. In addition, for the case of the president of the PTA, it is further desired for the properties of the president's Certificate 142 to be different from those of the general PTA members.

The Second System 110 or distinct Third Party 204 specifies at least one criteria 106 such as at least one predefined Attribute 106 as criteria for receiving a Certificate 142, block 304. For at least one embodiment at least one predefined attribute 106 is User information, such as but not limited to username, email address, city, state, gender, age, and/or relationship status.

A Third Party 204 is the entity specifying to the Authorizing System 112 the predefined Attribute 106 as criteria for receiving a Certificate 142, block 304. As noted above, in varying embodiments the Third Party 204 may be a Second System for which the issued Certificates 142 will permit network access, e.g., Second System 110, or a distinct entity that is separate from the Second System upon which network access will be permitted to Users 102 holding proper Certificates 142. In other words, for at least one embodiment the Third Party 204 is a Second System, and for yet another embodiment the Third Party 204 is not a Second System.

It is also understood and appreciated that the Third Party 204 may in varying embodiments be an automated system, an application, or a person, such as a network administrator. In addition, although shown to be in communication by communication link 114, in varying embodiments Third Party 204 may actually communicate the predefined Attribute 106 by voice over a telephone call, text message, in person delivery, or even more traditional snail mail or courier package.

In addition the at least one predefined Attribute 106 may be an association, such as but not limited to membership in a group, subscribing to another user, being a friend of another user, and/or listing a school/company/employer. Further still, in varying embodiments the at least one predefined Attribute 106 may also be an action taken by the user, such as but not limited to friending another party (such as another User or perhaps an Entity such as the PTA), posting comments about another party, and/or "liking" another party or post by another party. Moreover, the at least one predefined Attribute 106 may be one Attribute 108 or a plurality of different Attributes 108.

For the present example, at least one predefined Attribute 106 is an association with the PTA, and a second predefined Attribute 106 is being a President of the PTA.

The Authorizing System 112 receives the at least one predefined Attribute 106 (e.g., PTA, President of the PTA) from the Second System 110 or Third Party 204 and is in a general state of readiness to provide Certificates 142 to Users known to the First System 104 and possessing one or more Attributes 108 that correlate to the predetermined Attribute(s) 106 upon request.

For the sake of the present example, each User 102 who is a member of the PTA is aware of the upcoming conference and therefore visits the PTA Conference page of the Social Network 104 and finds an invitation to receive network access at the conference by clicking on an icon. If the User 102 has not previously established an identity with the First System 104, he or she may of course do so now as part of his or her effort Clicking on the icon is processed as a request and directed to the Authorizing System 112 as a request, block 306. For at least one embodiment, the request has at least one identifier. Moreover, the request is received by the Authorizing System 112 as an HTTP/HTTPS request having a session identifier. This request with session identifier permits the Authorizing System 112 to correctly identify the requesting User 102. Of course, the request may also include additional identifiers, such as the requesting Users username and/or other information.

As the Authorizing System 112 has been provided with the predefined Attributes 106, the Authorizing System 112 is structured and arranged to query the First System 104 with the identifier (so as to identify the requesting User 102) and the predefined Attribute 106. For at least one embodiment, the Authorizing System 112 is provided with a Service Account on the First System 104 which establishes any requisite permissions necessary for the querying process. In at least one alternative embodiment, the request from the User with at least one identifier may also include an invitation from the User to review his or her account, such as for example a Friend invitation.

If the User 102 is indeed a member of the PTA, the Authorizing System 112 will provide the User 102 with a Certificate 142 for network access on the Second System. In the case of the President of the PTA, the Authorizing System 112 notes not only the Users membership with the PTA, but also the additional predefined Attribute 106 of being President, and accordingly a different Certificate 142 is provided.

For example, User 102B who is known to First System 104 has membership in the group HOA but not the PTA. Upon receiving a request from User 102B, block 306, the Authorizing System 112 will query the First System 104 for Attributes 108 associated with User 102B, block 308. The Authorizing System 112 will evaluate the Attributes 108 associated with User 102B to the predefined Attributes 106, block 310.

As part of the evaluation process, method 300 proceeds to check for correlations between the Attributes 108 associated with User 102B and the predefined Attributes 106, decision 312. As User 102B does not have an Attribute 108 correlating to the predefined Attribute 106, i.e., PTA membership, no Certificate 142 is issued, block 314.

When the Authorizing System 112 receives a request from User 102A, block 306, the Authorizing System 112 will query the First System for Attributes 108 associated with User 102A, block 308. The Authorizing System 112 will evaluate the Attributes 108 associated with User 102A to the predefined Attribute 106, block 310.

As part of the evaluation process, method 300 proceeds to check for correlations between the Attributes associated with User 102A and the predefined Attribute 106, decision 312. In this case, User 102A has membership in the PTA so there is a correlation between the predefined Attribute 106 and the Attributes 108 associated with User 102A. As such the Authorizing System will issue a Certificate 142 with at least one characteristic to User 102A, block 316.

As noted above, optionally the method 300 permits Certificates 142 to be issued for different Users having different access privileges. For the present example this is based on a User 102 being the President of the PTA. When optional path 318 is engaged by method 300, the outcome discussed above for User 102A is substantially unchanged as User 102A does not have multiple correlating Attributes 108 correlating to multiple predefined Attributes 106, decision 320. This results in User 102A being issued a base Certificate 142, block 322.

Operating with the optional path 318, when the Authorizing System 112 receives a request from User 102D, block 306, the Authorizing System 112 will query the First System for Attributes 108 associated with User 102D, block 308. The Authorizing System 112 will evaluate the Attributes 108 associated with User 102D to the predefined Attributes 106, block 310.

As part of the evaluation process, method 300 proceeds to check for correlations between the Attributes 108 associated with User 102D and the predefined Attributes 106, decision 312. In this case, User 102D has membership in the PTA so there is a correlation between at least predefined Attribute 106 and the Attributes 108 associated with User 102D.

In addition, the Authorizing System 112 determines a correlation between multiple Attributes 108 associated with the User 102D and the predefined Attributes 106—specifically, that User 102D has both the Attribute 108 of membership with the PTA and the Attribute 108 of being the President of the PTA, decision 320. Accordingly, User 102D is issued an advanced Certificate 142, block 324. It is to be understood and appreciated that evaluating for multiple Attributes 108 can be a repeated process for embodiments having more than two (2) predefined Attributes 106 as presented in this example.

For at least one embodiment, method 300 is also applicable for implementations where all requesting Users 102 known to the First System 104 are provided with a Certificate 142. Moreover, as in the above description, a User 102 having at least one Attribute 108 correlating to at least one predefined Attribute 106, receives a Certificate 142. However, merely having an account on the First System 104 may be an Attribute 108. As such, with optional path 318 engaged, method 300 can adaptively provide "guest" Certificates 142 permitting minimal access (e.g., block 322), whereas a User 102 who is has the Attribute 108 of being a member of the PTA receives a more advanced certificate, block 324. In other words, for at least one embodiment, all Users who are at least known to the First System 104 and request a Certificate 142, may have their requests accommodated through the use of Certificates 142 having different characteristics.

Having received a Certificate 142, the User 102 is permitted to access the Second System 110, block 326.

With respect to the querying of the First System 104 by the Authorizing System 112, for at least one embodiment, the Authorizing System reviews substantially all of the Attributes 108 associated with the requesting User. This may be desired where in addition to the at least one predefined Attribute 106 there are perhaps additional desired attributes—is the User a runner would benefit from knowing about running trails, is the User a vegetarian or omnivore, is the User male or female, etc. . . . . Collecting these Attributes 108 may or may not alter the scope of the Certificate 142, but may be invaluable to the Second System 110 in creating a harmonious environment for the User 102. For at least one alternative embodiment, the querying is focused directly upon the at least one identifier and the predefined Attribute(s) 106.

It is also to be understood and appreciated that for at least one embodiment, providing or issuing the Users 102 with Certificates 142 further includes providing each qualified User with a token that may be used to obtain a Certificate 142. For at least one other alternative embodiment, providing or issuing the Users 102 with a Certificate 142 further includes providing the Users with instructions for how to receive the Certificate 142.

In addition, for at least one embodiment each Certificate 142 provided to each User has at least one characteristic. For at least one embodiment, these characteristics are selected from the group consisting of, but not exclusively limited to, root certificate authority, intermediate certificate authority, time period, common name, subject name, and/or subject's alternative name. In other words, each Certificate 142 may have embedded information regarding the Root Certificate Authority or Intermediate Authority who actually issued the Certificate 142, the time period that the Certificate 142 is viable for use—e.g., valid from Jan. 19, 2012 until Sep. 19, 2012, the User's name (Jon Smith), and/or the User's alternative name (Spiff28). For at least one embodiment the issued Certificate 142 are X.509 digital certificates.

With their Certificates 142 received, Users 102A, 102C, 102D and 102E are each permitted access to the Second System 110, block 326, and such access may be by direct network cable or wireless network access. With respect to FIGS. 1 and 2 and more specifically the network access represented by dotted lines 150 and 152, it is to be appreciated that method 300 advantageously permits a first user, e.g., User 102A, having a first set of correlating Attributes 108 to be provided with a Certificate 142 permitting different access then a second user, e.g., User 102D, having a second set of correlating Attributes 108, the first and second sets being different with respect to at least one correlated attribute 108. In the case of the present example, User 102D being President in addition to being a member of the PTA, whereas User 102A is simply a general member of the PTA.

For at least one embodiment, method 300 continues with the decision of whether to remain active for the further approval of additional Users 102 known to the First System 112, or to end, decision 328. It should also be understood and appreciated that multiple instances of requests from multiple Users may be processed substantially concurrently by the Authorizing System 112.

For at least one embodiment, method 300 may optionally include a subsequent set of steps intended to verify that changes have not occurred which should affect the issued Certificate 142. More specifically, method 300 may include having the Authorizing System 112 subsequently query the First System 104 with the at least one identifier for Attributes 108 associated with a User 102 who previously requested a Certificate 142, block 330.

The Authorizing System 112 will evaluate the Attributes 108 associated with User 102 to the predefined Attributes 106, block 332. As part of the evaluation process, method 300 proceeds to check for changes in correlations between the Attributes 108 associated with User 102 and the predefined Attributes 106, decision 334. For the sake of the present example, these changes would likely include no longer being a member of the PTA, no longer being the President of the PTA, or becoming the President of the PTA.

If no changes in the correlation of Attributes is detected (Attributes 108 associated with the User 102 and the predefined attribute(s) 106), no further action need be taken, and method 300 returns to ready state of continuing or exiting, decision 328. If a change in correlation is detected, the Authorizing System 112 acts to revoke the previously issued Certificate 142, block 336. The Authorizing System 112 may also optionally issue a new replacement Certificate 142, block 338. Revocation and reissue are generally accepted as the general nature of the Certificates 142, such as X.509 digital certificates, is that once issued they can not be modified. In the case of embodiments utilizing Certificates which may be modified, then direct modification of the issued Certificate 142 in place of revocation and reissue may be employed.

Moreover, with respect to FIGS. 1 and 2 it is understood and appreciated that method 300 advantageously utilizes the single sign on authentication for the First System 104 coupled with a specific predefined Attribute 106 to provide a subset of Users 102 with appropriate Certificates 142 for network access upon the Second System 110.

To summarize, with respect to FIGS. 1, 2 and 3 provided by at least one embodiment is a method 300 of providing a Certificate 142 for network access. This method 300 includes receiving at least one predefined Attribute 106 as criteria for receiving a Certificate 142. The method 300 also includes receiving from a User 102 known to a First System 104 a request for network access to a Second System 110, the request having at least one identifier. Querying of the First System 104 is then performed with the at least one identifier for Attributes 108 associated with the User 102, and the method 300 continues by evaluating the Attributes 108 associated with the User 102 to the at least one predefined Attribute 106. In response to at least one Attribute 108 associated with the User 102 correlating to the at least one predefined Attribute 106, the User 102 is provided with a Certificate 142 with at least one characteristic for network access on the Second System 110.

Method 300 may also be provided at least in part in the context of the computer executable instructions 146 shown in FIG. 1, having an input routine 134, a query routine 136, an evaluating routine 138 and an output routine 140 as described above, and as appropriately adapted for performing method 300.

Moreover, method 300 with respect to FIGS. 1, 2 and 3 may be implemented as SPC 100 in accordance with at least one embodiment wherein a First System 104 is structured and arranged as a single sign on system having a plurality of user accounts. In addition, SPC 100 includes a Third Party structured and arranged to establish at least one predefined Attribute 106 for receiving a Certificate 142 permitting network access on a second system 110. Further, SPC 100 includes an Authorizing System 112 structured and arranged to receive from the Third Party the at least one predefined Attribute 106, and in response to a request from a User 102 of the First System 104 for a Certificate 142 for the Second System 110, the Authorizing System 112 further structured and arranged to access the First System 104 to query user accounts for Attributes 108 associated with at least one User 102. The Authorizing System 112 will provide a Certificate 142 with at least one characteristic for network access on the Second System 110 to at least one User 102 having at least one Attribute 108 associated with the User 102 correlated to the at least one predefined Attribute 106.

Third Party Requested Certificate

Figure 4:
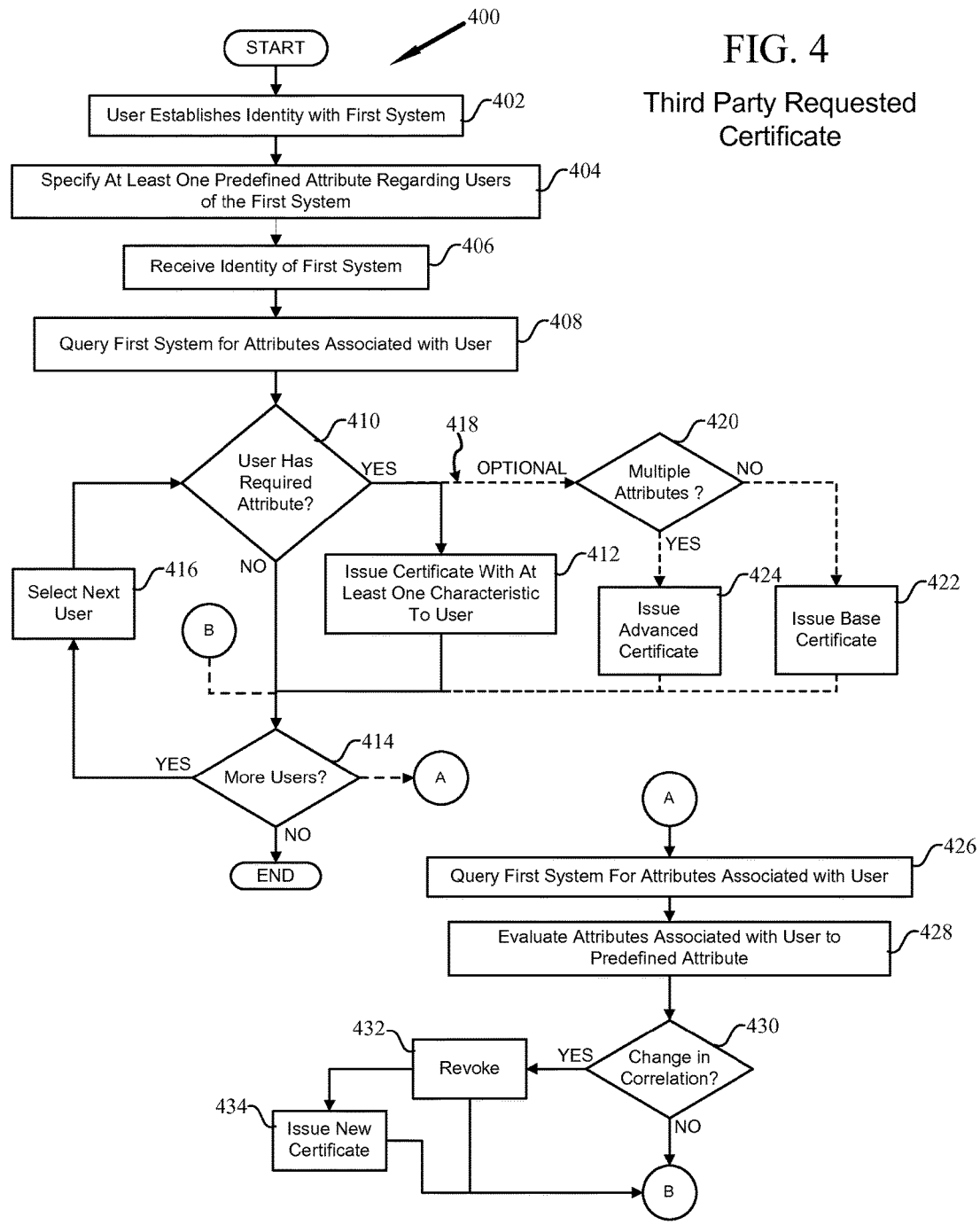
FIG. 4 is a high level flow diagram for a method of providing a certificate for network access upon a second system in response to a request by a third party to provide users with a predefined attribute network access upon a second system in accordance with at least one embodiment.

Turning now to FIG. 4, in connection with FIGS. 1 and 2, for at least one method 400, the request for a Certificate 142 is at least in part initiated by a Third Party who desires to permit Users 102 with at least one Attribute 108 correlating to at least one predefined Attribute 106 network access to a Second System 110. For the exemplary embodiment, method 400 typically commences with a User 102 establishing an identity with the First System 104, block 402. As noted above the First System 104 in at least one embodiment is a SSO system, and may further be a federated web services such as a social media site.

Indeed, there may be many Users 102A, 102B, 102C, 102D and 102E for example who have established identities with the First System 104. The precise nature of how each User 102 has established his or her identity is not of specific importance to the present teaching, but it is assumed that he or she has provided basic personal data, such as name, age, gender, address, email and completed at least a threshold of authentication processes, such as requesting a user ID and responding to an email confirming and/or verifying the request. Of course, it is understood and appreciated that this method of establishing a user identity with the First System 104 is merely one example of how a User may become known to the First System, and alternative systems and or methods may certainly be employed.

For the sake of this example it is assumed that the Second System 110 is hosting a conference for the PTA, and the Second System 110 desires to have Certificates 142 for network access issued to each of the Users 102 known to the First System 104 who is a member of the PTA. In addition, for the case of the president of the PTA, it is further desired for the properties of the president's Certificate 142 to be different from those of the general PTA members.

A Third Party 204 is the entity specifying to the Authorizing System 112 the criteria 106, and more specifically the predefined Attribute 106 as criteria for receiving a Certificate 142, block 404. As noted above, in varying embodiments the Third Party 204 may be a Second System for which the issued Certificates 142 will permit network access, e.g., Second System 110, or a distinct entity that is separate from the Second System upon which network access will be permitted to Users 102 holding proper Certificates 142. In other words, for at least one embodiment the Third Party 204 is a Second System, and for yet another embodiment the Third Party 204 is not a Second System.

It is understood and appreciated that the Third Party 204 may in varying embodiments be an automated system, an application, or a person, such as a network administrator. In addition, although shown to be in communication by communication link 114, in varying embodiments Third Party 204 may actually communicate the predefined Attribute 106 by voice over a telephone call, text message, in person delivery, or even more traditional snail mail or courier package.

For at least one embodiment at least one predefined Attribute 106 is User association, such as but not limited to membership in a group, subscribing to another user, being a friend of another user, and/or listing a school/company/employer. In addition, for yet other embodiments, at least one required Attribute 106 may be User information, such as but not limited to username, email address, city, state, gender, age, and/or relationship status.

Further still, in varying embodiments the at least one predefined Attribute 106 may also be an action taken by the user, such as but not limited to friending another party (such as another User or perhaps an Entity such as the PTA), posting comments about another party, and/or "liking" another party or post by another party. Moreover, the at least one predefined Attribute 106 may be one Attribute 108 or a plurality of different Attributes 108.

For the present example, at least one required Attribute 106 is the Attribute 108 of association with the PTA, and a second required Attributes 106 is the Attribute 108 of being a President of the PTA.

More specifically, for at least one embodiment, the Authorizing System 112 receives the identity of the First System 104 having a plurality of Users 102, each User 102 having at least one Attribute 108, as well as the at least one predefined Attribute 106 (e.g., PTA, President of the PTA) from the Second System 110 or Third Party 204, block 406. For at least one alternative embodiment, the identity of the First System 104 is already known to the Authorizing System 112—such as for example because the Authorizing System 112 has been previously affiliated with the First System 112.

For the sake of the present Example, each User 102 who is a member of the PTA need not be aware of the upcoming conference for the Authorizing System 112 to commence with preparing the requested Certificates 142.

Authorizing System 112 has been structured and arranged to query the First System 104 to determine at least a first subset of Users 102 having the at least one required Attribute 106, block 408. For at least one embodiment the Authorizing System 112 is provided with the identity of the First System 112 by the Third Party. For at least one alternative embodiment, the identity of the First System 104 is already known to the Authorizing System 112—such as for example because the Authorizing System 112 has been previously affiliated with the First System 112. For at least one embodiment, the Authorizing System 112 is provided with a Service Account on the First System 108 which establishes any requisite permissions necessary for the querying process.

For Users 102 who possess the at least one required Attribute 106 of being a member of the PTA, the Authorizing System will prepare a Certificate 142 for network access on the Second System 110. In the case of the President of the PTA, the Authorizing System 112 will not only note the Users membership with the PTA, but also the additional Attribute 108 of being President, and accordingly a different Certificate 142 will be prepared.

Moreover as shown in FIG. 4, for at least one embodiment the querying of the First System 104 is a repetitive process. A first User, e.g., User 102A is selected and as decision 410 indicates the Authorizing System 112 determines if User 102A has at least one required Attribute 106. For User 102A the answer is "Yes" and the Authorizing System 112 will issue a Certificate 142 with at least one characteristic to User 102A, block 412.

Distinct from the embodiment shown in FIG. 3 as described above, method 400 is not driven by requests from the Users 102. As such, the Authorizing System 112 will determine if there are more Users 102 to be evaluated, decision 414. If more Users 102 remain, the Authorizing System 112 will select the next, e.g., User 102B, block 416, and repeat the evaluation process, decision 410. In the case of User 102B, the evaluation of User 102B having the at least one required Attribute 106, e.g. at least PTA, will be "No," decision 410.

As noted above, optionally the method 400 permits Certificates 142 to be issued for different Users having different access privileges. For the present example this is based on a User 102 being the President of the PTA. When optional path 418 is engaged by method 400, the outcome discussed above for User 102A is substantially unchanged as User 102A does not have multiple required Attributes 106, decision 420. This results in User 102A being issued a base Certificate 142, block 422.

Operating with the optional path 418, when the Authorizing System 112 evaluates User 102D, the Authorizing System 112 determines if User 102D has at least one required Attribute 106. For User 102D the answer is "Yes," decision 410. The Authorizing System 112 then moves to determine if User 102D has multiple required Attributes 106, decision 420.

In the case of User 102D the answer is "Yes," User 102D is the President of the PTA. As such the Authorizing System 112 will issue an advanced Certificate 142, block 424. It is to be understood and appreciated that evaluating for multiple Attributes 108 can be a repeated process for embodiments having more than two (2) predefined Attributes 106 as presented in this example.

In short, under method 400, Authorizing System 112 queries the First System 104 and more specifically the accounts of each of the five shown Users 102A, 102B, 102C, 102D and 102E, and determines a first subset having the required Attribute 106 "PTA" to be Users 102A, 102C, 102D and 102E. In addition, the determined subset of Users 102 having the required Attributes 106 of "PTA" and "President of the PTA" is User 102D.

For at least one embodiment, the Authorizing System 112 may focus on at least one initial predefined required Attribute 106, such as the PTA. For a First System having a plurality of Users 102 such focusing may be desired so as to avoid time, energy, resource or other costs that may be associated with querying all Users of the First System 104 when only a portion are truly desired. Even with such focusing, the further determination of a subset of Users 102 having multiple required Attributes 106 can still be performed, such as for example to identify User 102D as the President of the PTA.

With respect to FIG. 2, it should be appreciated that Authorizing System 112 can query the First System 112, and more specifically Users 102 to prepare multiple Certificates 142 for multiple Second Systems, e.g., 110, 200 and 202 substantially concurrently.

It is also to be understood and appreciated that for at least one embodiment, providing or issuing the Users 102 with Certificate 142 further includes providing each qualified User with a token that may be used to obtain a Certificate 142. For at least one other alternative embodiment, providing or issuing the Users 102 with a Certificate 142 further includes providing the Users with instructions for how to receive the Certificate 142.

In addition, for at least one embodiment each Certificate 142 provided to each User has at least one characteristic. For at least one embodiment, these characteristics are selected from the group consisting of, but not exclusively limited to, root certificate authority, intermediate certificate authority, time period, common name, subject name, and/or subject's alternative name. In other words, each Certificate 142 may have embedded information regarding the Root Certificate Authority or Intermediate Authority who actually issued the Certificate 142, the time period that the Certificate 142 is viable for use—e.g., valid from Jan. 19, 2012 until Sep. 19, 2012, the User's name (Jon Smith), and/or the User's alternative name (Spiff28). For at least one embodiment the issued Certificates 142 are X.509 digital certificates.

With their Certificates 142 received, Users 102A, 102C, 102D and 102E are each permitted access to the Second System 110, and such access may be by direct network cable or wireless network access. With respect to FIGS. 1 and 2 and more specifically the network access represented by dotted lines 150 and 152, it is to be appreciated that method 300 advantageously permits a first user, e.g., User 102A, having a first set of correlating Attributes 108 to be provided with a Certificate 142 permitting different access then a second user, e.g., User 102D, having a second set of correlating Attributes 108, the first and second sets being different with respect to at least one correlated Attribute 108. In the case of the present example, User 102D being President in addition to being a member of the PTA, whereas User 102A is simply a general member of the PTA.

For at least one embodiment, method 400 may optionally include a subsequent set of steps intended to verify that changes have not occurred which should affect the issued Certificate 142. More specifically, method 400 may include having the Authorizing System 112 subsequently query the First System 104 for Attributes 108 associated with each User 102 who previously was issued a Certificate 142, block 426.

The Authorizing System 112 will evaluate the Attributes 108 associated with each User 102 to the required Attributes 106, block 428. As part of the evaluation process, method 400 proceeds to check for changes in correlations between the Attributes 108 associated with User 102 and the at least one required Attributes 106, decision 430. For the sake of the present example, these changes would likely include no longer being a member of the PTA, no longer being the President of the PTA, or becoming the President of the PTA.

If no changes in the correlation of Attributes 108 is detected, no further action need be taken. If a change in correlation is detected, the Authorizing System 112 acts to revoke the previously issued Certificate 142, block 432. The Authorizing System 112 may also optionally issue a new replacement Certificate 142, block 434. Revocation and reissue are generally accepted as the general nature of the Certificates 142, such as X.509 digital certificates, is that once issued they can not be modified. In the case of embodiments utilizing Certificates 142 which may be modified, then direct modification of the issued Certificate 142 in place of revocation and reissue may be employed.

Moreover, with respect to FIGS. 1 and 2 it is understood and appreciated that method 400 advantageously utilizes the single sign on authentication for the First System 108 coupled with at least one required Attribute 106 to provide a subset of Users 102 with appropriate Certificates 142 for network access upon the Second System 110.

To summarize with respect to FIGS. 1, 2 and 4 provided by at least one embodiment is a method 400 of providing a Certificate 142 for network access. This method 400 includes identifying a First System 104 having a plurality Users 102, each User 102 having at least one Attribute 108. The method also includes receiving at least one required Attribute 106 for Certificate 142 based network access. The method 400 proceeds by querying the First System 104 to determine at least a first subset of Users 102 having the at least one required Attribute 106. The method continues by providing a Certificate 142 with at least one characteristic for network access on a Second System 110 to each User 102 having the at least one required Attribute 106.

Method 400 may also be provided at least in part in the context of computer executable instructions 146 shown in FIG. 1, having an input routine 134, a query routine 136, an evaluating routine 138 and an output routine 140 as described above, and as appropriately adapted for performing method 400.

Moreover, method 400 with respect to FIGS. 1, 2 and 4 may be implemented as SPC 100 in accordance with at least one embodiment wherein a First System 104 is structured and arranged as a single sign on system having a plurality of user accounts. In addition, SPC 100 includes a Third Party structured and arranged to establish at least one predefined required Attribute 106 for receiving a certificate permitting network access on a Second System 110. Further, SPC 100 includes an Authorizing System 112 structured and arranged to receive from the Third Party the at least one predefined required Attribute 106. The Authorizing System 112 is also structured and arranged to access the First System 104 to query User accounts for Attributes 108 associated with at least one User 102. The Authorizing System 112 will provide a Certificate 142 with at least one characteristic for network access on the Second System 110 to at least one User 102 having at least one Attribute 108 associated with the User 102 correlated to the at least one predefined required Attribute 106.

Granted Permission Based Certificate

Figure 5:
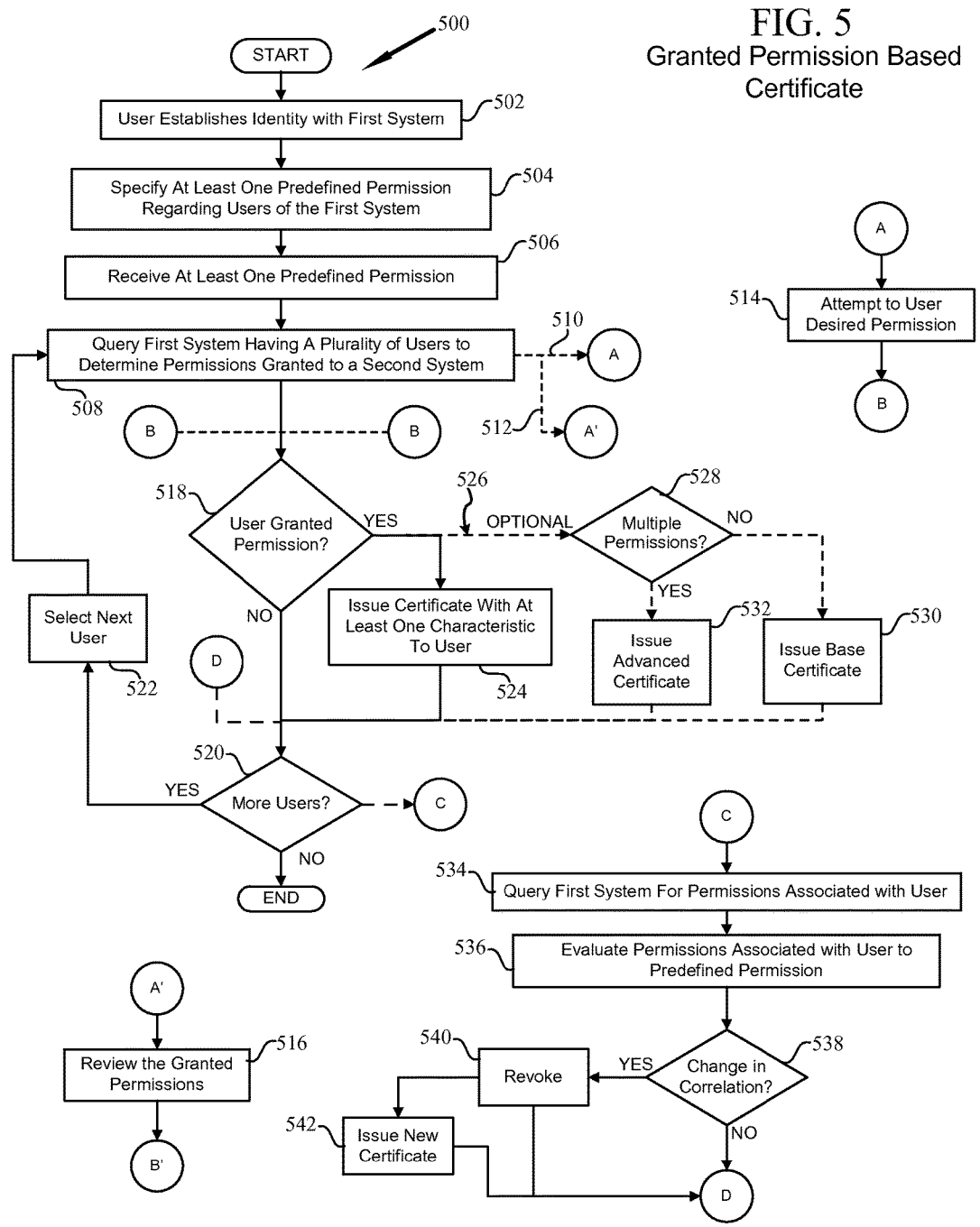
FIG. 5 is a high level flow diagram for a method of providing a certificate for network access upon a second system to users who have granted at least one permission to the second system in accordance with at least one embodiment.

Turning now to FIG. 5, shown is a high level flow diagram for a method 500 of providing a Certificate 142 for network access upon a Second System 110 to Users 102 who have the criteria 106 of having granted at least one Permission 126 to the Second System in accordance with at least one embodiment.

Moreover, for the case of the embodiment illustrated by FIG. 5, the granting or issuing of a Certificate 142 is not predicated on a traditional Attribute 108 such as User information, User Association, or User action. In this case, the criteria 106 is perhaps akin to a quid-pro-quo. For Users 102 who have granted Permissions 126 to the Second Site 110 or Third Party 204, those Users are provided with Certificates 142 granting Network Access upon the Second Site 110.

For example, a conference setting may exist with a large number of attendees. Wireless access, though provided might be significantly impaired due to the number of attendees. However, the enterprising conference provider adopting the methodology presented in FIG. 5 can provide dedicated wireless access on a secure network to those Users 102 who have granted Permissions 126 to the Second System 110. Such Permissions 126 might include Permission to post on the Users 102 social media page advertisements, or images regarding the products or services that are provided by the Second System 110. Further, even greater network access and or priority might be granted to Users 102 who grant Permissions 126 to the Second Site 110 to forward marketing information to the Users 102 immediate friends.

The nature of the system in which method 500 is applied, is for at least one embodiment substantially as is shown in FIGS. 1 and 2. As in the above discussed method 300 and method 400, here are again are plurality of Users 102, of which Users 102A, 102B, 102C, 102D and 102E are exemplary, with established identities upon a First System 104. Each User 102 has at least one Attribute 108 and more specifically may have one or more Permissions 126.

For the sake of this example it is assumed that Second System 202 is hosting an Expo for a Marathon running event, or perhaps is an Exhibitor who is hoping to attract participants to an upcoming running event and who has received permission from the Expo to provide wireless network access on a secured basis. Second System 202 desires to provide Users 102 who have granted at least one predefined Permission 106 to the Second System 202 to enjoy network access while at the Expo.

For the exemplary embodiment, method 500 typically commences with a User 102 establishing an identity with the First System 104, block 502. A Third Party 204 is the entity specifying to the Authorizing System 112 the predefined Permission 106 as criteria for receiving a Certificate 142, block 504. As noted above, in varying embodiments the Third Party 204 may be a Second System for which the issued Certificates 142 will permit network access, e.g., Second System 202, or a distinct entity that is separate from the Second System upon which network access will be permitted to Users 102 holding proper Certificates 142. In other words, for at least one embodiment the Third Party 204 is a Second System, and for yet another embodiment the Third Party 204 is not a Second System.

It is understood and appreciated that the Third Party 204 may in varying embodiments be an automated system, an application, or a person, such as a network administrator. In addition, although shown to be in communication by communication link 114, in varying embodiments Third Party 204 may actually communicate the predefined Attribute 106 by voice over a telephone call, text message, in person delivery, or even more traditional snail mail or courier package. For at least one embodiment, the Authorizing System 112 is provided with a Service Account on the First System 108 which establishes any requisite Permissions necessary for the querying process.

For the present example, at least one predefined Permission 106 is Permission 126 to post on the Users page in the First System 104, and a second predefined Permission 106 is Permission 126 to Friend the User. Moreover, in varying embodiments, Permissions 126, such as but not limited to Permission to read all or most of the user's data upon the first system, Permission to send messages, Permission to join groups, Permission to join events, Permission to friend, Permission to send messages, and the like may be implemented individually or collectively so as to permit a variety of different Certificates 142 to be issued for Users 102 providing different degrees of Permission 126 to the Second System 202.

For at least one embodiment, the Authorizing System 112 receives the identity of the First System 104 having a plurality of Users 102, as well as the at least one predefined Permission 106 (e.g., Posting="Yes") from the Second System 110 or Third Party 204, block 506. For at least one alternative embodiment, the identity of the First System 104 is already known to the Authorizing System 112—such as for example because the Authorizing System 112 has been previously affiliated with the First System 112.

The Authorizing System 112 has been further structured and arranged to query the First System 104 to determine at least a first subset of Users 102 having the least one predefined Permission 106, and so such a query is performed, block 508.

There are at least two options for how such a query may be performed and they are shown as option path 510 (A-B) and option path 512 (A'-B'). For option path 510 the method of query is perhaps described as a test, an attempt is made to use the desired Permission 106, block 514. This is an active test for the Permission 126. For option path 512 the method of query is to review the Permission 126 options indicated by the User, block 516. This is a passive test for the Permission 126.

For either the option, the results of the query for the predefined Permission 106 are evaluated, decision 518. If the queried User 102 has not provided the predefined Permission 106, for at least one embodiment method 500 proceeds to review if more Users 102 remain to be queried, decision 520. If the answer is "Yes," method 500 selects the next User 102, block 522 and repeats the query for the at least one predefined Permission 106, block 508.

If method 500 determines that a predetermined required Permission 106 has indeed been granted, the granting User 102 is issued a Certificate 142 with at least one Characteristic for network access upon the Second System 202, block 524. Again the method proceeds to review if more Users 102 remain to be queried, decision 520. If the answer is "Yes," method 500 selects the next User 102, block 522 and repeats the query for the at least one predefined Permission 106, block 508.

Moreover, a first User, e.g., User 102A is selected and as decision 518 indicates the Authorizing System 112 determines if User 102A has the predefined Permission 106. For User 102A the answer is "No"—User 102A has not established for Second System 202 the Permission 126 to post on his page. As such the Authorizing System does not issue a Certificate 142 to User 102A.

Upon selecting and querying User 102E, the answer of decision 518 is "Yes"—User 102E has established Permission 126 for the Second System 202 to post on his page. For at least one embodiment, method 500 proceeds to issue User 102E a Certificate 142, block 524.

As noted above, optionally the method 500 permits Certificates 142 to be issued for different Users having different access privileges. For the present example this is based on a User 102 not only granting the Permission 126 to the Second System 202 to post on his or her page on the First System 104, but also granting the Permission 126 to Friend the User. When optional path 526 is engaged by method 500, for user 102E as decision 518 returned as "Yes" for the Permission to Post, method 500 continues by querying for additional granted Permissions 126 that correlate to additional predefined Permissions 106, e.g., the Permission to Friend.

Similar to the above examples for the general members of the PTA and the President of the PTA, if User 102E has granted the additional Permission to Friend, User 102E will be issued an advanced Certificate 142, block 532. For purposes of this example however, it is assumed that User 102E has only granted the first predefined Permission 106 for posting, and as such is issued a base Certificate 142, block 530.

Moreover, for at least one embodiment as shown, it is understood and appreciated that method 500 is a repeating process operating in response to the Third Party providing at least one predefined Permission 106. It should be appreciated that method 500 may be adapted such that the querying is performed in to the Authorizing System 112 receiving a request for network access upon the Second System 202 from a User 102 known to the First System 104—the request having at least one identifier and triggering the querying of the First System 104 with the at least one identifier to determine Permissions 126 granted to the Second System 202 by the requesting User 102.

With respect to FIG. 2, it should be appreciated that Authorizing System 112 can query the First System 104, and more specifically Users 102 for predefined Permissions 106 to prepare multiple Certificates 142 for multiple Second Systems, e.g., 110, 200 and 202 substantially concurrently.

It is also to be understood and appreciated that for at least one embodiment, providing or issuing the Users 102 with Certificate 142 further includes providing each qualified User with a token that may be used to obtain a Certificate 142. For at least one other alternative embodiment, providing or issuing the Users 102 with a Certificate 142 further includes providing the Users with instructions for how to receive the Certificate 142.

In addition, for at least one embodiment each Certificate 142 provided to each User has at least one characteristic. For at least one embodiment, these characteristics are selected from the group consisting of, but not exclusively limited to, root certificate authority, intermediate certificate authority, time period, common name, subject name, and/or subject's alternative name. In other words, each Certificate 142 may have embedded information regarding the Root Certificate Authority or Intermediate Authority who actually issued the Certificate 142, the time period that the Certificate 142 is viable for use—e.g., valid from Jan. 19, 2012 until Sep. 19, 2012, the User's name (Jon Smith), and/or the User's alternative name (Spiff28). For at least one embodiment the issued Certificates 142 are X.509 digital certificates.

With a Certificate 142 received, User 102E is permitted access to the Second System 202. As Second System 202 has been presented in this example as an Expo, it is likely that the access will be by wireless network, but direct cable access is also within the sprit of the example. If connectivity within the Expo is sparse for cellular based network access, Second System 202 may encourage other Users to grant Permissions 126 to enjoy improved access in exchange for the posting of marketing material.

For at least one embodiment, method 500 may optionally include a subsequent set of steps intended to verify that changes have not occurred which should affect the issued Certificate 142. More specifically, method 500 may include having the Authorizing System 112 subsequently query the First System 104 for Permissions 126 associated with each User 102 who previously was issued a Certificate 142, block 534.

The Authorizing System 112 will evaluate the Permissions 126 associated with each User 102 to the predefined Permission 106, block 536. As part of the evaluation process, method 500 proceeds to check for changes in correlations between the Permissions 126 associated with User 102 and the at least one predefined Permission 106, decision 538. For the sake of the present example, these changes would likely include no longer permitting the Second Site 202 to post.

If no changes in the correlation of Permissions is detected, no further action need be taken. If a change in correlation is detected, the Authorizing System 112 acts to revoke the previously issued Certificate 142, block 540. The Authorizing System 112 may also optionally issue a new replacement Certificate 142, block 542. Revocation and reissue are generally accepted as the general nature of the Certificates 142, such as X.509 digital certificates, is that once issued they can not be modified. In the case of embodiments utilizing Certificates 142 which may be modified, then direct modification of the issued Certificate 142 in place of revocation and reissue may be employed.

Moreover, with respect to FIGS. 1 and 2 it is understood and appreciated that method 500 advantageously utilizes the single sign on authentication for the First System 104 coupled with at least one predefined Permission 106 to provide a subset of Users 102 with appropriate Certificates 142 for network access upon the Second System 202.

To summarize with respect to FIGS. 1, 2 and 5 provided by at least one embodiment is a method 500 of providing a Certificate 142 for network access. This method 500 includes receiving at least one predefined Permission 106 as criteria for receiving a Certificate 142. The method includes querying a First System 104 having a plurality of Users 102 to determine Permissions 126 granted to a Second System 202 by at least a first subset of Users 102. In response to at least one Permission 126 granted by a User 102 in the first subset correlating to the at least one predefined Permission 106, the User 102 is provided with a Certificate 142 with at least one Characteristic for network access on the Second System 202.

More specifically, for at least one embodiment, the method 500 includes receiving at least one predefined Permission 106 as criteria for receiving a Certificate 142, and receiving from a User 102 known to a First System 104 a request for network access to a Second System 202, the request having at least one identifier. Querying of the First System 104 is then performed with the at least one identifier to determine Permissions 126 associated with the User 102, and the method 500 continues by evaluating the determined granted Permissions 126 to the at least one predefined Permission 106. In response to at least one Permission 126 granted by the User 102 correlating to the at least one predefined Permissions 106, the User 102 is provided with a Certificate 142 with at least one characteristic for network access on the Second System 202.

And, for yet at least one alternative embodiment, method 500 includes identifying a First System 104 having a plurality Users 102, at least one User 102 having at least one Permission 126. The method 500 also includes receiving at least one predefined Permission 106 for Certificate 142 based network access. The method 500 proceeds by querying the First System 104 to determine at least a first subset of Users 102 having the at least one predefined Permission 106. The method continues by providing a Certificate 142 with at least one characteristic for network access on a Second System 110 to each User 102 having the at least one predefined Permission 106.

Method 500 may also be provided at least in part in the context of computer executable instructions 146 shown in FIG. 1, having an input routine 134, a query routine 136, an evaluating routine 138 and an output routine 140 as described above, and as appropriately adapted for performing method 500.

Moreover, method 500, with respect to FIGS. 1, 2 and 5 may be implemented as SPC 100 in accordance with at least one embodiment wherein a First System 104 is structured and arranged as a single sign on system having a plurality of User 102 accounts. In addition, SPC 100 includes a Third Party 204 structured and arranged to establish predefined required Permission 106 for receiving a Certificate 142 permitting network access on a Second System 202. Further, SPC 100 includes an Authorizing System 112 structured and arranged to receive from the Third Party 204 the at least one predefined required Permission 106. In response to a request to generate Certificates 142 for Users 102 of the first system having the at least one predefined required Permission 106, the Authorizing System 112 further structured and arranged to access the First System 104 to query User 102 accounts for Permissions 126 associated with at least one User 102. The Authorizing System 112 will provide a Certificate 142 with at least one characteristic for network access on a Second System 110 to at least one User 102 having at least one Permission 126 associated with the User 102 correlated to the at least one predefined required Permission 106.

Certificate Based on List Membership

Figure 6:
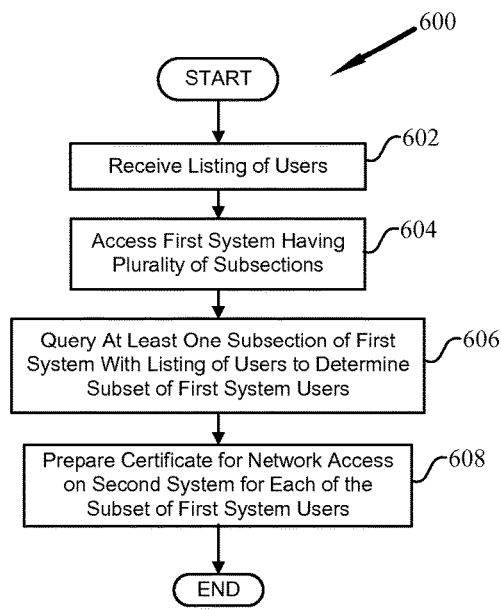
FIG. 6 is s high level flow diagram for a method of providing a certificate based on the user accepting membership for a subsection of a social network in accordance with at least one embodiment.
Figure 7:
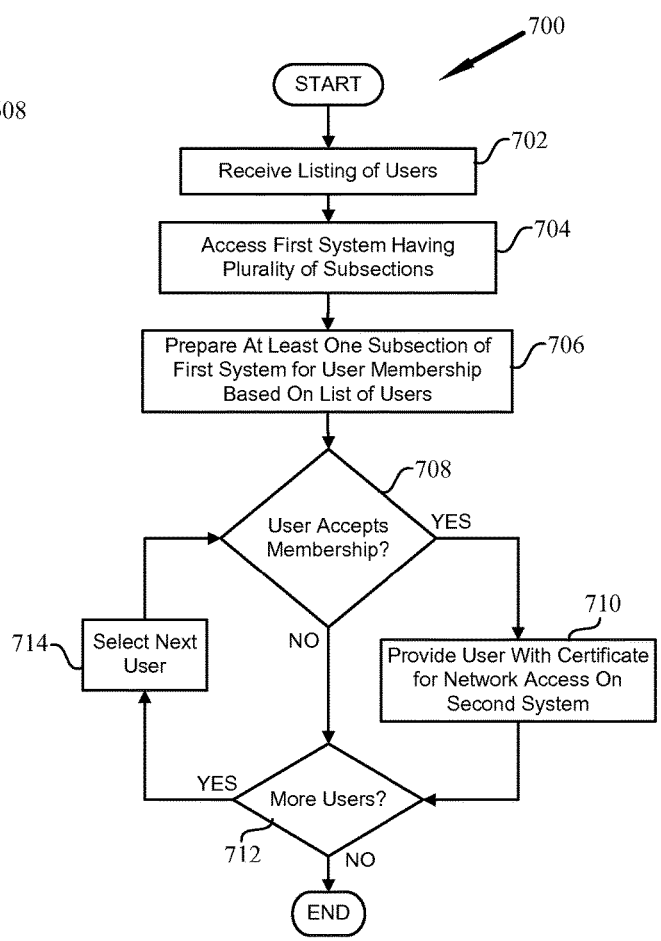
FIG. 7 is a high level flow diagram for a method of providing a certificate based on the user being an existing member of a subsection of a social network in accordance with at least one embodiment.

Turning now to FIGS. 6 and 7 in connection with FIGS. 1 and 2, presented are two additional methods 600 and 700 for providing a Certificate 142 for network access. In contrast to the above described methods, in methods 600 and 700 the entitlement to receive a Certificate 142 is based at least in part on the criteria 106 of the User 102 being on a provided list, and the receiving User 102 being a member or anticipated member of a group or other definable subsection of a First System, e.g., First System 110. The First System 110 in at least one embodiment is a SSO system, and may further be a federated web services such as a social media site.

For the exemplary embodiment of method 600, it is understood and appreciated that the base elements of an environment exist as shown in FIG. 1 and or FIG. 2. Specifically there are a plurality of Users 102, such as exemplary Users 102A, 102B, 102C, 102D and 102E for example who have established identities with the First System 104.

The precise nature of how each User 102 has established his or her identity is not of specific importance to the present teaching, but it is assumed that he or she has provided basic personal data, such as name, age, gender, address, email and completed at least a threshold of authentication processes, such as requesting a user ID and responding to an email confirming and/or verifying the request. Of course, it is understood and appreciated that this method of establishing a user identity with the First System 104 is merely one example of how a User may become known to the First System, and alternative systems and or methods may certainly be employed.

For the sake of the present example, it is assumed that the second System 110 is hosting a conference for the PTA, and the Second System 110 desires to have Certificates 142 for network access issued to a list of Users 102 who are affiliated with the PTA, i.e., the list of Users 102 identifies persons who may be members of a subsection of First System 110. In other words, list membership is key for a User to be provided with a Certificate 142.

A Third Party 204 is the entity specifying to the Authorizing System 112 the criteria 106, and more specifically the list of Users who should receive a Certificate 142, and as noted above, in varying embodiments the Third Party 204 may be a Second System for which the issued Certificates 142 will permit network access, e.g., Second System 110, or a distinct entity that is separate from the Second System upon which network access will be permitted to Users 102 holding proper Certificates 142. In other words, for at least one embodiment the Third Party 204 is a Second System, and for yet another embodiment the Third Party 204 is not a Second System.

It is also understood and appreciated that the Third Party 204 may in varying embodiments be an automated system, an application, or a person, such as a network administrator. In addition, although shown to be in communication by communication link 114, in varying embodiments Third Party 204 may actually communicate the predefined Attribute 106 by voice over a telephone call, text message, in person delivery, or even more traditional snail mail or courier package.

In other words, a User 102 simply being included in the listing is not the basis for providing a Certificate 142, and a User 102 simply being a member of a subsection on the First System 104 is not the basis for providing a Certificate 142. For at least one embodiment, the User 102 should be both on the list and a member of the specified subsection of First System 104 to receive a Certificate 142.

Method 600 commences with the receipt of a listing of Users 102 who are entitled to receive a Certificate 142, block 602. An Authorizing System 112 as shown in FIGS. 1 and 2 is in communication with a public network 116 such that has access to the First System 104. Moreover, the Authorizing System 112 has been structured and arranged to access the First System 104, block 604.

The Authorizing System 112 is structured and arranged to query the First System 104, and more specifically a specified subsection of the First System 104, such as the PTA subsection, with the listing of Users 102 to determine a subset of the First System Users 102, block 606. For at least one embodiment, the Authorizing System 112 is provided with a Service Account on the First System 104, which establishes any requisite Permissions necessary for the querying process.

Method 600 continues with the preparing of a Certificate 142 for network access on the Second System 110 for each of the subset of First System Users 102, block 608. It is also to be understood and appreciated that for at least one embodiment, providing or issuing the Users 102 with Certificate 142 further includes providing each qualified User with a token that may be used to obtain a Certificate 142. For at least one other alternative embodiment, providing or issuing the Users 102 with a Certificate 142 further includes providing the Users with instructions for how to receive the Certificate 142.

In addition, for at least one embodiment each Certificate 142 provided to each User has at least one characteristic. For at least one embodiment, these characteristics are selected from the group consisting of, but not exclusively limited to, root certificate authority, intermediate certificate authority, time period, common name, subject name, and/or subject's alternative name. In other words, each Certificate 142 may have embedded information regarding the Root Certificate Authority or Intermediate Authority who actually issued the Certificate 142, the time period that the Certificate 142 is viable for use—e.g., valid from Jan. 19, 2012 until Sep. 19, 2012, the User's name (Jon Smith), and/or the User's alternative name (Spiff28). For at least one embodiment the issued Certificates 142 are X.509 digital certificates.

With respect to the conceptual settings depicted in FIGS. 1 and 2, for the present example user 102E may be included upon the listing of users who are to eligible to receive a Certificate 142 as he is known to be a member of the PTA, but if user 102E is unknown to the First System 104, then User 102E will not be provided with Certificate 142.

Method 700 provides a slight variation to method 600. For the example of Method 700, a slightly different example setting may further illustrate the advantageous nature of method 700. Moreover for this example let it be assumed that Second System 110 is a school or university and at least a subset of Users 102 are students who are expected to be enrolled at the school or university in the near future. To facilitate the control of network access at the school, e.g., Second System 110 it is desired to employ the use of Certificates 142.

Here, the criteria 106 and more specifically a listing of Users 102 who are expected to attend has been developed and is received by the Authorizing System 112, block 702. Again as discussed above for method 600, the Authorizing System 112 is shown in communication with a public network 116 such that it has access to the First System 104. Moreover, the Authorizing System 112 has been structured and arranged to access the First System 104, block 704. For at least one embodiment, the Authorizing System 112 is provided with a Service Account on the First System 104, which establishes any requisite Permission necessary for accessing and querying.

In accordance with at least one embodiment of method 700, the Authorizing System 112 proceeds to prepare at least one subsection of the First System 104 for user membership based on the list of Users 102, block 706. In keeping with the present example, such exemplary preparation might include establishing a new subsection of the First System 104 as "Incoming Class" and providing general information regarding class schedules and a tentative roster of students, i.e. Users, enrolled in each class, as well as perhaps other general information about the school.

Receipt of a Certificate 142 is dependent upon a User 102 accepting membership in the subsection. For at least one embodiment, each User who appeared in the listing of Users is approached in turn regarding his or her acceptance of membership. For example, each User 102 can be contacted via email and invited to access the First System 104 so as to establish his or her account, if not previously existing, and to accept his or her membership in the subsection that has been prepared in response to the listing of Users 102.

More specifically, a User is provided with an opportunity accept his or her membership, decision 708. If the User 102 accepts, he or she is provided with a Certificate 142 for network access on the Second System 110, block 710. In varying embodiments, the Authorizing System may prepare each Certificate 142 in substantially real time in response to a User 102 accepting membership, or the Authorizing System may have prepared each Certificate 142 in advance. If prepared in advance, the roll of providing the Certificates 142 may actually be assumed by the Second System 110 or Third Party 204.

If the User elects not to accept membership, decision 708, method 700 proceeds to evaluate whether or not there are more Users 102 who have yet to accept or reject membership, decision 712. If more Users remain, the next User 714 is selected, block 714.

It is also to be understood and appreciated that for at least one embodiment, providing or issuing the Users 102 with Certificate 142 further includes providing each qualified User with a token that may be used to obtain a Certificate 142. For at least one other alternative embodiment, providing or issuing the Users 102 with a Certificate 142 further includes providing the Users with instructions for how to receive the Certificate 142.

In addition, for at least one embodiment each Certificate 142 provided to each User has at least one characteristic. For at least one embodiment, these characteristics are selected from the group consisting of, but not exclusively limited to, root certificate authority, intermediate certificate authority, time period, common name, subject name, and/or subject's alternative name. In other words, each Certificate 142 may have embedded information regarding the Root Certificate Authority or Intermediate Authority who actually issued the Certificate 142, the time period that the Certificate 142 is viable for use—e.g., valid from Jan. 19, 2012 until Sep. 19, 2012, the User's name (Jon Smith), and/or the User's alternative name (Spiff28). For at least one embodiment the issued Certificates 142 are X.509 digital certificates.

Moreover, with respect to FIGS. 1 and 2 it is understood and appreciated that methods 600 and 700 advantageously utilizes the single sign on authentication for the First System 104 coupled with a User identified in a predefined listing of Users 102 to provide appropriate Certificates 142 for network access upon the Second System 110.

In addition to the above methods as described, it is also appreciated that in varying embodiments, the system and method may perform a subsequent query of the First System to verify that each User 102 provided with a Certificate 142 is still in compliance with membership in at least the specified subsection of the First System 104. When and as changes are realized, the prior issued Certificate(s) can be revoked, and if necessary new Certificate(s) may be provided.

To summarize, with respect to FIGS. 1, 2, and 6, provided by at least one embodiment is a method 600 of providing a Certificate 142 for network access. This method 600 includes receiving a listing of Users 102. The method 600 also includes accessing a First System 104 having a plurality of subsections, and querying the First System 104 with the listing of users to determine at least a subset of First System 104 Users 102. The method continues by preparing a Certificate 142 with at least one characteristic for network access on a Second System 110 for each of the subset of First System 104 users 102.

To summarize, with respect to FIGS. 1, 2, and 7, provided by at least one embodiment is a method 700 of providing a Certificate 142 for network access. This method 700 includes receiving a listing of Users 102. The method 700 also includes accessing a First System 104 having a plurality of subsections, and preparing at least one subsection of the First System 104 for User membership based on the listing of Users. Upon a User 102 in the list of Users accepting Membership in the Subsection of the First System 104, the accepting User is provided Certificate 142 with at least one characteristic for network access on a Second System 110 for each of the subset of First System 104 users 102.

With respect to the above methods 300, 400, 500, 600 and 700 it should also be understood and appreciated that in varying embodiments, combinations of method elements may also be advantageously combined. For example, for at least one embodiment, to be provided with a Certificate 142 for access upon a Second System 110, the requesting User 102 should have not only at least one Attribute 108 such as membership in a group, i.e., the PTA, but the User 102 must also have granted a Permission 126 to the Second System 110 or Third Party 204. For yet another embodiment, it may be desired for a User 102 to be provided with a Certificate 142, he or she should not only have at least one Attribute such as a User Action regarding the Second System 110 or Third Party 204, but also must have granted at least one Permission 126 to the Second System 110 or Third Party 204.

In addition with respect to the above discussions, it is understood and appreciated that the Certificates 142 provided to Users 108, may be adapted for use other than or in addition to network access. Moreover, the methods and systems presented herein are indeed adapted and intended for use in providing Certificates 142 for Network Access upon one or more Second Systems 110, 200 and 202. But it is understood and appreciated that the teachings for how such Certificates 142 are provided are indeed applicable to other settings where Certificates 142 are desired by Second Systems 110, 200 and 202 for applications that may or may not involve network access.

Figure 8:
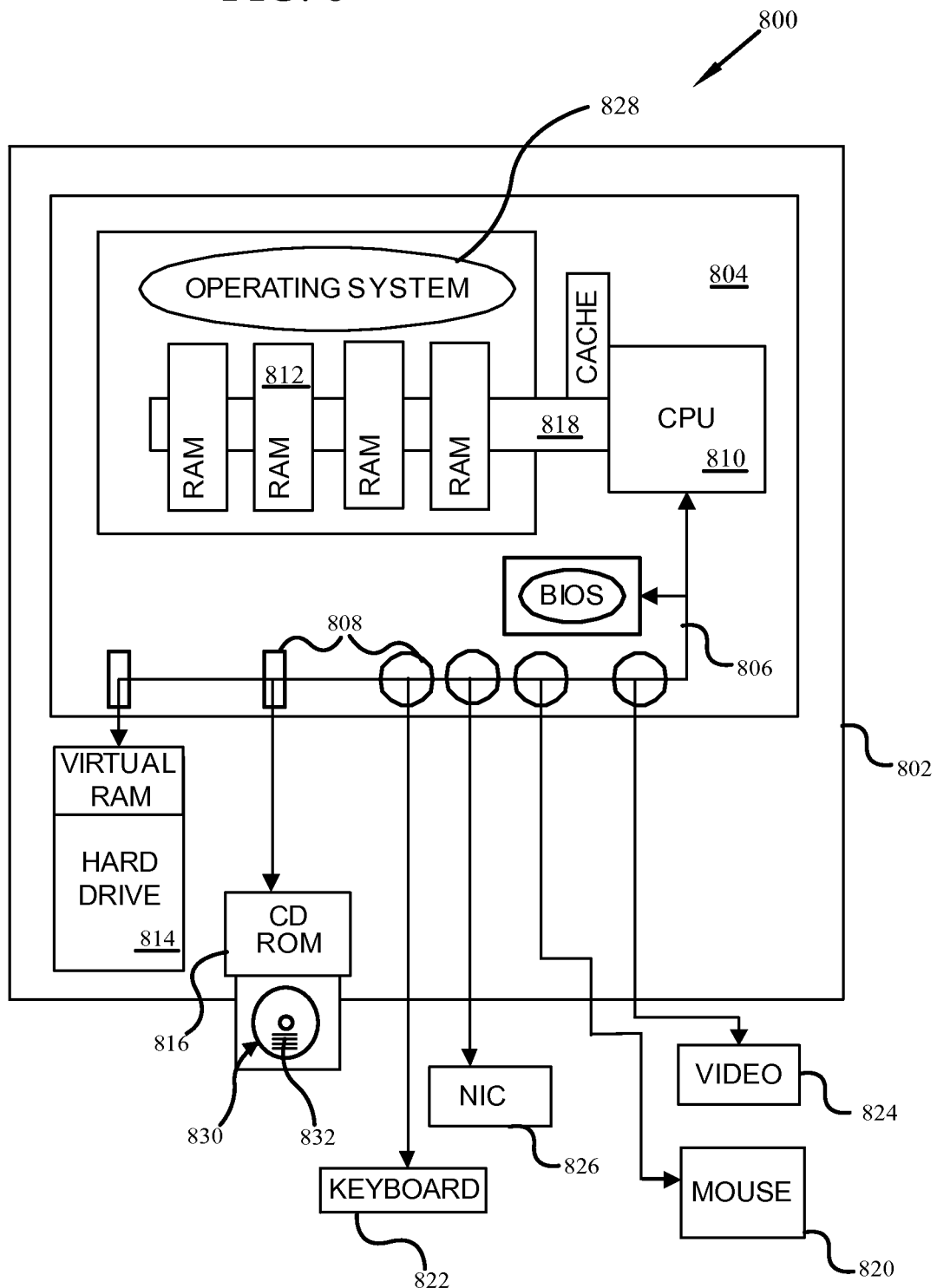
FIG. 8 is a high level block diagram of a computer system in accordance with at least one embodiment.

With respect to the above description of the system and method for providing a Certificate, it is understood and appreciated that the method may be rendered in a variety of different forms of code and instruction as may be used for different computer systems and environments. To expand upon the initial suggestion of the First System 104, Second System 110, 200, 202/Third System 204 and Authorizing System 112 being computer systems adapted to their specific roles, FIG. 8 is a high level block diagram of an exemplary computer system 800 such as may be provided for one or more of the elements comprising the First System 104, Second System 110, 200, 202/Third System 204 and Authorizing System 112.

Computer system 800 has a case 802, enclosing a main board 804. The main board 804 has a system bus 806, connection ports 808, a processing unit, such as Central Processing Unit (CPU) 810 with at least one microprocessor (not shown) and a memory storage device, such as main memory 812, hard drive 814 and CD/DVD ROM drive 816.

Memory bus 818 couples main memory 812 to the CPU 810. A system bus 806 couples the hard disc drive 814, CD/DVD ROM drive 816 and connection ports 808 to the CPU 810. Multiple input devices may be provided, such as, for example, a mouse 820 and keyboard 822. Multiple output devices may also be provided, such as, for example, a video monitor 824 and a printer (not shown). As computer system 800 is intended to be interconnected with other computer systems in the SPC 100 a combined input/output device such as at least one network interface card, or NIC 826 is also provided.

Computer system 800 may be a commercially available system, such as a desktop workstation unit provided by IBM, Dell Computers, Gateway, Apple, or other computer system provider. Computer system 800 may also be a networked computer system, wherein memory storage components such as hard drive 814, additional CPUs 810 and output devices such as printers are provided by physically separate computer systems commonly connected together in the network. Those skilled in the art will understand and appreciate that the physical composition of components and component interconnections are comprised by the computer system 800, and select a computer system 800 suitable for one or more of the computer systems incorporated in the formation and operation of MTDC 100.

When computer system 800 is activated, preferably an operating system 826 will load into main memory 812 as part of the boot strap startup sequence and ready the computer system 800 for operation. At the simplest level, and in the most general sense, the tasks of an operating system fall into specific categories, such as, process management, device management (including application and user interface management) and memory management, for example. The form of the computer-readable medium 828 and language of the program 830 are understood to be appropriate for and functionally cooperate with the computer system 800.

Moreover, variations of computer system 800 may be adapted to provide the physical elements of one or more components comprising each First System 104, Second System 110, 200, 202/Third System 204 and Authorizing System 112 the switches, routers and such other components as may be desired and appropriate for the methods and systems of providing a Certificate 142 for network access.

Changes may be made in the above methods, systems and structures without departing from the scope hereof. It should thus be noted that the matter contained in the above description and/or shown in the accompanying drawings should be interpreted as illustrative and not in a limiting sense. Indeed many other embodiments are feasible and possible, as will be evident to one of ordinary skill in the art. The claims that follow are not limited by or to the embodiments discussed herein, but are limited solely by their terms and the Doctrine of Equivalents.

What is claimed is:

1. A method of providing a certificate for based secured wireless network layer access in response to a user request comprising:

identifying a first system having at least one processor and a plurality of users, each user having at least one attribute;

receiving from a third party at least one predefined required attribute for secured network layer access upon a second system providing a secured wireless network, the secured wireless network requiring a Public Key Infrastructure ("PKI") certificate for network layer authentication to the wireless network;

receiving from a user known to the first system a request for certificate based network layer network access to a second system having at least one processor, the request having at least one identifier;

querying the first system with the at least one identifier for attributes associated with the user requesting the certificate based network layer network access to a second system;

evaluating the attributes associated with the user requesting the certificate to the least one predefined required attribute for the PKI certificate in order to access the second system; and in response to at least one attribute associated with the user requesting the PKI certificate correlating to the at least one predefined required attribute, providing the requesting user with a PKI certificate with at least one characteristic for certificate based network layer authentication for network layer access to the secured wireless network of the secured second system, the second system distinct from the first, the PKI certificate provided from a system other than the first system;

wherein a first user having a first set of correlating attributes is provided with a PKI certificate permitting different access than a second user having a second set of correlating attributes, the first and second sets being different with respect to at least one correlated attribute.

2. The method of claim 1, wherein the network layer network access is OSI Layer 2-3 access.

3. The method of claim 1, wherein network access to the second system is established based upon the PKI certificate before an application layer may request a user name and password.

4. The method of claim 1, wherein without a PKI certificate the user cannot establish network access with the second system.

5. The method of claim 1, wherein the at least one predefined required attribute is user information.

6. The method of claim 5, wherein the user information is selected from the group consisting of: username, email address, city, state, gender, age, relationship status.

7. The method of claim 1, wherein the predefined required attribute is specified by the second system.

8. The method of claim 1, wherein the PKI certificate is an X.509 certificate.

9. The method of claim 1, wherein the at least one characteristic of the PKI certificate is selected from a group consisting of root certificate authority, intermediate certificate authority, time period, common name, subject name, subject's alternative name.

10. A method of providing a certificate for certificate based secured wireless network layer access in response to a user request comprising:

identifying a first system having at least one processor and a plurality of users, each user having at least one attribute;

receiving from a third party at least one predefined required attribute for secured network layer access upon a second system providing a secured wireless network, the secured wireless network requiring a Public Key Infrastructure ("PKI") certificate for network layer authentication to the wireless network;

receiving from a user known to the first system a request for OSI Layer 2-3 network access to a second system having at least one processor and distinct from the first system, the request having at least one identifier;

querying the first system with the at least one identifier for attributes associated with the user requesting the certificate based network layer network access to a second system;

evaluating the attributes associated with the user requesting the certificate to the at least one predefined required attribute for the PKI certificate in order to access the second system; and in response to at least one attribute associated with the user requesting the PKI certificate correlating to the at least one predefined required attribute, providing the requesting user with a PKI certificate with at least one characteristic for certificate based network layer authentication for network OSI Layer 2-3 access to the secured wireless network of the secured second system, the second system distinct form from the first, the PKI certificate provided from a system other than the first system;

wherein a first user having a first set of correlating attributes is provided with a certificate permitting different access than a second user having a second set of correlating attributes, the first and second sets being different with respect to at least one correlated attribute.

11. The method of claim 10, wherein network access to the second system is established based upon the PKI certificate before an application layer may request a user name and password.

12. The method of claim 10, wherein without a PKI certificate the user cannot establish network access with the second system.

13. The method of claim 10, wherein the at least one predefined required attribute is user information.

14. The method of claim 10, wherein the user information is selected from the group consisting of: username, email address, city, state, gender, age, relationship status.

15. The method of claim 10, wherein the predefined required attribute is specified by the second system.

16. The method of claim 10, wherein the PKI certificate is an X.509 certificate.

17. The method of claim 10, wherein the at least one characteristic of the PKI certificate is selected from a group consisting of root certificate authority, intermediate certificate authority, time period, common name, subject name, subject's alternative name.

18. A non-transitory machine readable medium on which is stored a computer program for providing a certificate for based secured wireless network layer access in response to a user request for network access, the computer program comprising instructions which when executed by a computer system having at least one processor performs the steps of:

identifying a first system having at least one processor and a plurality of users, each user having at least one attribute;

receiving from a third party at least one predefined required attribute for secured network layer access upon a second system providing a secured wireless network, the secured wireless network requiring a Public Key Infrastructure ("PKI") certificate for network layer authentication to the wireless network;

receiving from a user known to the first system a request for certificate based network layer network access to a second system having at least one processor, the request having at least one identifier;

querying the first system with the at least one identifier for attributes associated with the user requesting the certificate based network layer network access to a second system;

evaluating the attributes associated with the user requesting the certificate to the least one predefined required attribute for the PKI certificate in order to access the second system; and in response to at least one attribute associated with the user requesting the PKI certificate correlating to the at least one predefined required attribute, providing the requesting user with a PKI certificate with at least one characteristic for certificate based network layer authentication for network layer access to the secured wireless network of the secured second system, the second system distinct from the first, the PKI certificate provided from a system other than the first system;

wherein a first user having a first set of correlating attributes is provided with a certificate permitting different access than a second user having a second set of correlating attributes, the first and second sets being different with respect to at least one correlated attribute.

19. The non-transitory machine readable medium of claim 18, wherein the network layer network access is OSI Layer 2-3 access.

20. The non-transitory machine readable medium of claim 18, wherein network access to the second system is established based upon the PKI certificate before an application layer may request a user name and password.

21. The non-transitory machine readable medium of claim 18, wherein without a PKI certificate the user cannot establish network access with the second system.

22. The non-transitory machine readable medium of claim 18, wherein the at least one predefined required attribute is user information.

23. The non-transitory machine readable medium of claim 18, wherein the user information is selected from the group consisting of: username, email address, city, state, gender, age, relationship status.

24. The non-transitory machine readable medium of claim 18, wherein the predefined required attribute is specified by the second system.

25. The non-transitory machine readable medium of claim 18, wherein the PKI certificate is an X.509 certificate.

26. The non-transitory machine readable medium of claim 18, wherein the at least one characteristic of the PKI certificate is selected from a group consisting of root certificate authority, intermediate certificate authority, time period, common name, subject name, subject's alternative name.

27. A non-transitory machine readable medium on which is stored a computer program comprising instructions to adapt a computer system having a processor to provide a certificate for certificate based secured wireless network layer access in response to a user request for network access, the computer program comprising:

an input routine operative associated with an input device for receiving from a third party at least one predefined required attribute as criteria for receiving a Public Key Infrastructure ("PKI") certificate for secured network layer access upon a second system providing a secured wireless network, the secured wireless network requiring a PKI certificate for network layer authentication to the wireless network, and for receiving from a user authenticated to a first system a request for certificate based OSI Layer 2-3 wireless network access to a second system distinct from the first system, the request having at least one identifier;

a query routine for querying the first system with the at least one identifier for attributes associated with the user requesting the certificate based secured wireless network access and evaluating the associated attributers to the predefined required attribute for the PKI certificate in order to access the second system, the querying performed by other than one of the user requesting the PKI certificate; and an output routine for providing the requesting user with a PKI certificate with at least one characteristic for certificate based network layer authentication for network OSI Layer 2-3 access to the secured wireless network of the secured second system, the second system distinct from the first, the PKI certificate provided from a system other than the first system;

wherein a first user having a first set of correlating attributes is provided with a certificate permitting different access than a second user having a second set of correlating attributes, the first and second sets being different with respect to at least one correlated attribute.

28. The non-transitory machine readable medium of claim 27, wherein the network layer network access is OSI Layer 2-3 access.

29. The non-transitory machine readable medium of claim 27, wherein network access to the second system is established based upon the PKI certificate before an application layer may request a user name and password.

30. The non-transitory machine readable medium of claim 27, wherein without a PKI certificate the user cannot establish network access with the second system.

31. The non-transitory machine readable medium of claim 27, wherein the at least one predefined required attribute is user information.

32. The non-transitory machine readable medium of claim 27, wherein the user information is selected from the group consisting of: username, email address, city, state, gender, age, relationship status.

33. The non-transitory machine readable medium of claim 27, wherein the predefined required attribute is specified by the second system.

34. The non-transitory machine readable medium of claim 27, wherein the PKI certificate is an X.509 certificate.

35. The non-transitory machine readable medium of claim 27, wherein the at least one characteristic of the PKI certificate is selected from a group consisting of root certificate authority, intermediate certificate authority, time period, common name, subject name, subject's alternative name.

36. A system for providing a certificate for based secured wireless network layer access in response to a third party request comprising:

a first system having at least one processor structured and arranged as a single sign on system having a plurality of user accounts corresponding to a plurality of users remote from the first system;

a third party structured and arranged to establish at least one predefined required attribute for receiving a Public Key Infrastructure ("PKI") certificate permitting secured network layer access upon a second system providing a secured wireless network, the secured wireless network requiring a PKI certificate for network layer authentication to the wireless network, the second system having at least one processor, the second system distinct from the first system; and an authorizing system structured and arranged to receive from the third party the at least one predefined required attribute for the PKI certificate in order to access the second system, and in response to a request from a user of the first system for a PKI certificate for certificate based network access to the second system the authorizing system further structured and arranged to access the first system to query the remote user accounts for attributes associated with at least one user, the authorizing system providing a PKI certificate with at least one characteristic derived from the attributes associated with the requesting user for certificate based network layer authentication to the secured wireless network of the secured second system to at least one requesting user having at least one attribute associated with the requesting user correlated to the at least one predefined required attribute;

wherein a first user having a first set of correlating attributes is provided with a certificate permitting different access than a second user having a second set of correlating attributes, the first and second sets being different with respect to at least one correlated attribute.

37. The system of claim 36, wherein the network layer network access is OSI Layer 2-3 access.

38. The system of claim 36, wherein network access to the second system is established based upon the PKI certificate before an application layer may request a user name and password.

39. The system of claim 36, wherein without a PKI certificate the user cannot establish network access with the second system.

40. The system of claim 36, wherein the at least one predefined required attribute is user information.

41. The system of claim 36, wherein the user information is selected from the group consisting of: username, email address, city, state, gender, age, relationship status.

42. The system of claim 36, wherein the predefined required attribute is specified by the second system.

43. The system of claim 36, wherein the PKI certificate is an X.509 certificate.

44. The system of claim 36, wherein the at least one characteristic of the PKI certificate is selected from a group consisting of root certificate authority, intermediate certificate authority, time period, common name, subject name, subject's alternative name.

* * * * *